US012793890B2

(12) United States Patent
Vaisman et al.

(10) Patent No.: US 12,793,890 B2
(45) Date of Patent: Nov. 10, 2026

(54) BASE FOR A CAPACITOR AND CAPACITOR ASSEMBLIES

(71) Applicant: Vishay Israel LTD., Petach Tiqwa (IL)

(72) Inventors: Pavel Vaisman, Omer (IL); Andrey Mitiagin, Dimona (IL); Steve Breithaupt, North Bennington, VT (US); Matt Lang, Milford, CT (US); Asa Rogers, Johnsonville, NY (US)

(73) Assignee: Vishay Israel LTD., Petach Tiqwam (IL)

( * ) Notice: Subject to any disclaimer, the term of this patent is extended or adjusted under 35 U.S.C. 154(b) by 117 days.

(21) Appl. No.: 18/679,949

(22) Filed: May 31, 2024

(65) Prior Publication Data

US 2025/0372301 A1 Dec. 4, 2025

(51) Int. Cl.
*H01G 2/02* (2006.01)
*H01G 2/10* (2006.01)
*H01G 13/00* (2013.01)

(52) U.S. Cl.
CPC ................. *H01G 2/02* (2013.01); *H01G 2/10* (2013.01); *H01G 13/00* (2013.01)

(58) Field of Classification Search
CPC ............ H01G 2/02; H01G 2/10; H01G 13/00; H01G 9/008; H01G 9/10; H01G 9/08; H01G 4/38; H01G 11/08; H01G 11/10; H01G 11/78; H01G 11/82
See application file for complete search history.

(56) References Cited

U.S. PATENT DOCUMENTS

| | | | |
|---|---|---|---|
| 2,089,686 | A | 8/1937 | Clark et al. |
| 2,686,892 | A | 8/1954 | Lilienfeld |
| 2,834,926 | A | 5/1958 | Booe |
| 2,871,425 | A | 1/1959 | Burnham |
| 2,908,849 | A | 10/1959 | Taylor |
| 3,138,746 | A | 6/1964 | Burger et al. |
| 3,275,902 | A | 9/1966 | Mchugh et al. |
| 3,531,693 | A | 9/1970 | Buice |

(Continued)

FOREIGN PATENT DOCUMENTS

| | | | |
|---|---|---|---|
| CA | 2452932 | A1 | 6/2004 |
| CN | 306839543 | S | 9/2021 |

(Continued)

OTHER PUBLICATIONS

Amazon. link: https://www.amazon.com/capacitor-universal-replacement-connection-engineering/dp/B0CN9B6N5R, Nov. 14, 2023, Capacitor Universal Replacement (2023).

(Continued)

*Primary Examiner* — Timothy J. Dole
*Assistant Examiner* — Esther N Lian
(74) *Attorney, Agent, or Firm* — Volpe Koenig

(57) ABSTRACT

A capacitor is provided that includes a capacitor body and a surface mount device (SMD) base. The capacitor body includes a casing, a first lead wire, and a second lead wire. The base includes an electrical assembly, a housing formed around the electrical assembly, and first and second contact pads for electrically coupling to first and second lead wires of the capacitor body. The electrical assembly includes an electrical connector connected to the second lead wire, and a conductive tab from which the second contact pad is formed.

15 Claims, 17 Drawing Sheets

(56) References Cited

U.S. PATENT DOCUMENTS 3,624,460 A 11/1971 Correll
3,956,819 A 5/1976 Augeri
3,976,922 A 8/1976 Peck et al.
4,245,275 A 1/1981 Cannon
4,377,404 A 3/1983 Hoshikawa et al.
4,394,713 A 7/1983 Yoshida
4,523,255 A 6/1985 Rogers
4,546,415 A 10/1985 Kent et al.
4,578,993 A 4/1986 Burandt
4,780,797 A 10/1988 Libby
4,942,500 A 7/1990 Libby et al.
4,987,519 A 1/1991 Hutchins et al.
5,001,607 A 3/1991 Breithaupt
5,043,849 A 8/1991 Libby
5,105,341 A 4/1992 Stephenson et al.
5,131,388 A 7/1992 Pless et al.
5,245,513 A 9/1993 Maijers et al.
5,288,566 A 2/1994 Ginatta et al.
5,334,219 A 8/1994 Kroll
5,338,472 A 8/1994 Yokoyama et al.
5,369,547 A 11/1994 Evans
5,391,186 A 2/1995 Kroll et al.
5,437,941 A 8/1995 Arledge et al.
5,454,147 A 10/1995 Kobayashi et al.
5,469,325 A 11/1995 Evans
5,507,966 A 4/1996 Liu
5,522,851 A 6/1996 Fayram
5,607,454 A 3/1997 Cameron et al.
5,621,608 A 4/1997 Arai et al.
5,673,168 A 9/1997 Efford et al.
5,801,917 A 9/1998 Elias
5,894,403 A 4/1999 Shah et al.
5,926,362 A 7/1999 Muffoletto et al.
5,959,830 A 9/1999 Inagawa et al.
5,982,609 A 11/1999 Evans
6,146,786 A 11/2000 Stadnick et al.
6,157,531 A 12/2000 Breyen et al.
6,197,184 B1 3/2001 Hemphill et al.
6,231,993 B1 5/2001 Stephenson et al.
6,238,444 B1 5/2001 Cadwallader
6,334,879 B1 1/2002 Muffoletto et al.
6,380,577 B1 4/2002 Cadwallader
6,400,554 B1 6/2002 Shiraishi et al.
6,477,037 B1 11/2002 Nielsen et al.
6,509,588 B1 1/2003 Michael
6,522,524 B1 2/2003 Feger et al.
6,560,089 B2 5/2003 Miltich et al.
6,571,126 B1 5/2003 Michael
6,576,026 B1 6/2003 Shiraishi et al.
6,586,134 B2 7/2003 Skoumpris
6,594,140 B1 7/2003 Evans et al.
6,678,559 B1 1/2004 Breyen et al.
6,687,118 B1 2/2004 Michael
6,707,660 B1 3/2004 Evans et al.
6,791,821 B1 9/2004 Monnett
6,801,424 B1 10/2004 Nielsen et al.
6,807,048 B1 10/2004 Nielsen et al.
6,819,544 B1 11/2004 Nielsen et al.
6,833,987 B1 12/2004 Michael
6,850,405 B1 2/2005 Mileham et al.
6,859,353 B2 2/2005 Elliott et al.
6,875,318 B1 4/2005 Gabriele et al.
6,898,066 B1 * 5/2005 Lin .......................... H01G 9/10 361/519
6,914,769 B2 7/2005 Welsch et al.
6,946,220 B2 9/2005 Probst et al.
6,952,339 B1 10/2005 Knowles
6,957,103 B2 10/2005 Schmidt et al.
6,963,482 B2 11/2005 Breyen et al.
7,012,799 B2 3/2006 Muffoletto et al.
7,038,901 B2 5/2006 Muffoletto et al.
7,072,171 B1 7/2006 Muffoletto et al.
7,085,127 B2 8/2006 Goldberger et al.
7,092,242 B1 8/2006 Gloss et al.
7,118,828 B2 10/2006 Dodd et al.
7,164,574 B2 1/2007 Barr et al.
7,169,284 B1 1/2007 Jiang et al.
D550,172 S 9/2007 Aguilar
7,271,994 B2 9/2007 Stemen et al.
7,274,551 B1 9/2007 Parler, Jr. et al.
7,283,350 B2 10/2007 Katraro et al.
7,342,774 B2 3/2008 Hossick-Schott et al.
7,348,097 B2 3/2008 Nielsen et al.
D566,043 S 4/2008 Nakamura et al.
7,355,840 B2 4/2008 Doffing et al.
7,419,873 B2 9/2008 Doffing et al.
7,443,653 B2 10/2008 Kim et al.
7,456,073 B2 11/2008 Fife et al.
7,483,260 B2 1/2009 Ziarniak et al.
7,531,010 B1 5/2009 Feger et al.
7,611,615 B2 11/2009 Cohen et al.
7,705,110 B2 4/2010 Anderson
7,710,713 B2 5/2010 Restorff et al.
7,715,174 B1 5/2010 Beauvais et al.
7,733,631 B2 6/2010 Brabeck et al.
7,768,772 B2 8/2010 Doffing et al.
7,813,107 B1 10/2010 Druding et al.
7,983,022 B2 7/2011 Laurie
8,086,312 B2 12/2011 Nielsen et al.
8,238,079 B1 8/2012 Knowles
8,259,435 B2 9/2012 Millman et al.
8,339,769 B2 12/2012 Schott et al.
8,405,956 B2 3/2013 Dreissig et al.
8,451,586 B2 5/2013 Priban
8,477,479 B2 7/2013 Pease et al.
8,576,544 B2 11/2013 Rawal et al.
8,605,411 B2 12/2013 Biler et al.
8,687,347 B2 4/2014 Bates et al.
D731,491 S 6/2015 Larson et al.
9,070,512 B2 6/2015 Breithaupt et al.
9,076,592 B2 7/2015 Masheder et al.
9,105,401 B2 8/2015 Dreissig et al.
D743,341 S 11/2015 Jiang et al.
D759,602 S 6/2016 Murphy et al.
D759,606 S 6/2016 Stowers et al.
D765,047 S 8/2016 Stowers et al.
9,737,724 B2 8/2017 Eidelman et al.
9,859,065 B1 1/2018 Lim et al.
9,947,479 B2 4/2018 Eidelman et al.
10,176,930 B2 1/2019 Eidelman et al.
10,522,298 B2 12/2019 Eidelman et al.
D893,432 S 8/2020 Murphy et al.
11,189,431 B2 11/2021 Eidelman et al.
11,482,383 B2 * 10/2022 Masuda ................... H01G 9/08
D1,043,567 S 9/2024 Wu
2003/0011967 A1 1/2003 Nielsen et al.
2003/0088293 A1 5/2003 Clarke et al.
2004/0127952 A1 7/2004 Michael
2004/0195093 A1 10/2004 Cohen et al.
2004/0225327 A1 11/2004 Norton et al.
2004/0240149 A1 12/2004 Lessner et al.
2005/0077342 A1 4/2005 Chen et al.
2005/0177193 A1 8/2005 Nielsen et al.
2005/0219787 A1 10/2005 Stevenson et al.
2005/0264979 A1 12/2005 Breyen et al.
2006/0012945 A1 1/2006 Doffing et al.
2006/0023400 A1 2/2006 Sherwood
2006/0291140 A1 12/2006 Kazaryan et al.
2007/0211412 A1 9/2007 Fife et al.
2007/0211413 A1 9/2007 Fife et al.
2008/0026286 A1 1/2008 Cui et al.
2008/0170353 A1 7/2008 Swanson et al.
2008/0216602 A1 * 9/2008 Zimmermann ........... B22F 7/08 204/192.1
2008/0232029 A1 9/2008 Ning
2008/0232030 A1 9/2008 Jones et al.
2008/0232032 A1 9/2008 Jones et al.
2008/0247122 A1 10/2008 Vaisman et al.
2009/0073638 A1 3/2009 Fujii et al.
2009/0273885 A1 11/2009 Jiang et al.
2010/0175235 A1 7/2010 Nielsen et al.
2010/0268292 A1 10/2010 Eidelman et al.
2010/0297495 A1 11/2010 Casby et al.
2010/0318142 A1 12/2010 Chen

(56) References Cited

U.S. PATENT DOCUMENTS

| | | | | |
|---|---|---|---|---|
| 2012/0087062 | A1 | 4/2012 | Kurita et al. | |
| 2012/0106029 | A1 | 5/2012 | Galvagni et al. | |
| 2012/0127632 | A1 | 5/2012 | Evans et al. | |
| 2012/0257327 | A1 | 10/2012 | Zednickova et al. | |
| 2013/0095299 | A1 | 4/2013 | Evans | |
| 2014/0104755 | A1 | 4/2014 | Hagiwara et al. | |
| 2014/0268499 | A1 | 9/2014 | Michael | |
| 2015/0030281 | A1 | 1/2015 | Chan et al. | |
| 2015/0179349 | A1 | 6/2015 | Biler et al. | |
| 2016/0189876 | A1 | 6/2016 | Djebara et al. | |
| 2016/0336115 | A1 | 11/2016 | Kaiser et al. | |
| 2017/0207031 | A1* | 7/2017 | Eidelman | H01G 9/145 |
| 2019/0080844 | A1 | 3/2019 | Tadera et al. | |
| 2019/0198251 | A1 | 6/2019 | Inoue et al. | |
| 2020/0020486 | A1* | 1/2020 | Eidelman | H01G 9/008 |
| 2020/0075264 | A1* | 3/2020 | Eidelman | H01G 9/028 |
| 2021/0074678 | A1* | 3/2021 | Hsu | H10W 90/00 |
| 2023/0059398 | A1 | 2/2023 | Park et al. | |

FOREIGN PATENT DOCUMENTS

| | | | |
|---|---|---|---|
| CN | 306839544 | S | 9/2021 |
| GB | 760761 | A | 11/1956 |
| GB | 794631 | A | 5/1958 |
| GB | 1055362 | A | 1/1967 |
| GB | 2036432 | B | 7/1983 |
| JP | S56169534 | U | 12/1981 |
| JP | H02280310 | A | 11/1990 |
| JP | H0341921 | U | 4/1991 |
| JP | H05234814 | A | 9/1993 |
| JP | H09326327 | A | 12/1997 |
| KR | 301093085 | | 1/2019 |
| WO | 1994000193 | A1 | 1/1994 |
| WO | 2008084314 | A1 | 7/2008 |

OTHER PUBLICATIONS

Korea JCC: http://www.k-jcc.com/product/pro032.aspx Visited capacitor (Year: 2025).

New EP1 Wet Tantalum Capacitor Offers Industry-High Capacitance, Design Flexibility for Military and Avionics Systems, Vishay New Product Information, Sep. 2017 (2 pages).

Technique tools: https://techniquetools/com.au/products/motor-capacitor-box-base-cmg?srsltid=AfmBOoqxvWEK48EvObnpx1FLxDaE_HXd836EymQxO9krT4fJJig7-rc3. Visited Sep. 2, 2025. Motor Capacitor Box Base, CMG (Year 2025).

Wet Tantalum Capacitors, High Energy, Ultra High Capacitance, −55° C. to +125° C. Operation Vishay Product Sheet, 2017 (2 pages).

Wet Tantalum Capacitors, High Energy, Ultra High Capacitance, −55° C. to +125° C. Operation, Vishay Datasheet, Document No. 42107, Jun. 19, 2017 (8 pages).

* cited by examiner

BASE FOR A CAPACITOR AND CAPACITOR ASSEMBLIES

FIELD OF DISCLOSURE

This application relates to the field of electronic components, and more specifically, to capacitors and capacitor assemblies.

BACKGROUND

Wet capacitors are used in the design of circuits due to their volumetric efficiency, stable electrical parameters, high reliability and long service life. Such capacitors typically have a larger capacitance per unit volume than certain other types of capacitors, making them valuable in high-current, high-power, and low-frequency electrical circuits. One type of wet capacitor is a wet electrolytic capacitor. A wet electrolytic capacitor includes two conducting surfaces (an anode and a cathode) whose function is to store electrical charge, and a fluid electrolyte. An insulating material or dielectric separates the two conducting surfaces. Wet electrolytic capacitors tend to offer a good combination of high capacitance and low leakage current.

Wet electrolytic capacitors are basic to various types of electrical equipment from satellites, aerospace, airborne, military group support, oil exploration, power supplies, and the like. In any of these example applications, the capacitor may be exposed to harsh environmental conditions, including extreme temperatures, pressure, moisture, shock, vibration, and the like.

The capacitor must be able to withstand these harsh environmental conditions while maintaining its accuracy, service life, and ability to be powered at very high temperatures with no maintenance. Failure of a capacitor due to harsh environmental conditions would necessitate its removal for repairs, which would result in delays and other associated expenses. Additionally, many of these example applications include significant dimensional or layout constraints, as the field of electronics is consistently demanding smaller parts and devices. For example, reductions in both mounting area and component profile (i.e., height) are highly demanded in most current applications.

Known wet electrolytic capacitors, such as Tantalum (Ta) electrolytic capacitors, are generally characterized as having a cylindrical shape and axial leaded terminations. Tantalum electrolytic capacitors known in the art may use tantalum for the anode material. The tantalum anode body (also commonly referred to as a "slug" or "pellet") is usually sintered. A wire (which also is formed of tantalum) is commonly formed in the anode body in one of two ways: (1) "embedded," meaning the wire is encased in tantalum powder during a pressing process; or (2) "welded," meaning after the pellet is pressed and sintered, the wire is welded to the tantalum anode body. The other end of the wire extends outside of the tantalum anode body. The capacitor dielectric material made by anodic oxidation of the anode material to form an oxide layer over the surface of the anode body (e.g., Ta to $Ta_2O_5$). A capacitor cathode may be formed by coating an inner surface of the body or case of the capacitor that encloses the tantalum anode body. The cathode may be formed of sintered tantalum or electrophoretically deposited tantalum or any other method known in the art, and coupled to a cathode terminal. The cathode may be formed of sintered tantalum, electrophoretically deposited tantalum, graphite, palladium, Ruthenium (IV) oxide ($RuO_2$) or any other acceptable materials known in the art, and coupled to a cathode terminal. A fluid electrolyte separates the cathode and the anode body and provides for electrical communication between the cathode and anode body. Although cylindrical shaped capacitors with axial leaded terminations generally perform reliably in harsh environmental conditions, their provided energy density is limited by their cylindrical shape and limited surface area of their surfaces (anode and cathode), as the surface area of the two surfaces determines the capacitance of the capacitor. Additionally, dimensional constraints often make their application difficult.

Other types of known wet electrolytic capacitors are characterized as having a circular or square shaped capacitor body or "can" with radial leaded terminations. While circular or square shaped capacitors with radial leaded terminations may provide higher energy density when compared to cylindrical shaped capacitors with axial leaded terminations, their ability to operate in harsh environmental conditions is limited. Additionally, circular or square shaped capacitors with radial leaded terminations generally have limited ability to survive in high shock or vibration environments.

Known wet electrolytic capacitors may have anode wires that are not secured within the capacitor case, can or body. In addition, known wet electrolytic capacitors do not have internal arrangements or components that are configured to secure the anode wires and thereby account for, compensate for, diminish and/or or lessen or prevent damage from shock, high frequency, and vibration.

For example, known wet electrolytic capacitors may be used in connection with high energy products. Such products may have difficulty accounting for, by way of example, shock, high-frequency vibration, and random vibration without any damage to the electrical parameters of such products. The capacitors of such products may move, as they are not firmly clamped or secured. This anode movement may lead to anode wire breakage and/or scratches or abrasions to dielectric surfaces of the anodes which may increase the direct leakage current (DCL).

Some known wet electrolytic capacitors may be surface mount devices (SMDs) having a base that is mounted directly to a surface of a printed circuit board (PCB). However, existing bases typically have multiple weld stops which makes manufacturing these wet electrolytic capacitors very cumbersome, inefficient, and expensive. These bases are also not capable of being mounted to different types or versions of known wet electrolytic capacitors, necessitating the design, qualification, and manufacturing of different bases for different wet electrolytic capacitors.

At present, therefore, a need exists for an improved SMD base for a wet electrolytic capacitor. There further exists a need for an improved SMD base capable of being mounted to different types or versions of wet electrolytic capacitors.

SUMMARY

Bases for capacitor assemblies are provided having simpler manufacturing processes and increased compatibility with different wet electrolytic capacitor types or versions.

According to an aspect of the disclosure, a base for a capacitor is provided. The base includes an electrical assembly including an electrical connector and a conductive tab electrically coupled to the electrical connector. The base further includes a housing formed around at least a portion of the electrical assembly and including a first recessed portion and a second recessed portion. The base further includes a first contact pad mounted to the first recessed portion of the housing. The first contact pad is configured to electrically couple to a first lead wire of a capacitor body through a casing of the capacitor body. The first contact pad is configured to provide a first terminal for electrically coupling to an electrical circuit. The base further includes a second contact pad disposed in the second recessed portion of the housing and formed from a portion of the conductive tab. The second contact pad is configured to electrically couple to a second lead wire of the capacitor body through the electrical connector and the conductive tab. The second contact pad is configured to provide a second terminal for electrically coupling to the electrical circuit.

According to an aspect of the disclosure, a capacitor is provided that includes a capacitor body and a base. The capacitor body includes a casing, a first lead wire, and a second lead wire. The base includes an electrical assembly including an electrical connector and a conductive tab electrically coupled to the electrical connector. The base further includes a housing formed around at least a portion of the electrical assembly and including a first recessed portion and a second recessed portion. The base further includes a first contact pad mounted to the first recessed portion of the housing. The first contact pad is configured to electrically couple to the first lead wire of the capacitor body through the casing of the capacitor body. The first contact pad is further configured to provide a first terminal for electrically coupling the capacitor to an electrical circuit. The base further includes a second contact pad disposed in the second recessed portion of the housing and formed from a portion of the conductive tab. The second contact pad is configured to electrically couple to the second lead wire of the capacitor body through the electrical connector and the conductive tab. The second contact pad is further configured to provide a second terminal for electrically coupling the capacitor to the electrical circuit.

According to an aspect of the disclosure, a method of forming a base for a capacitor is provided. The method includes the step of forming an electrical assembly including an electrical connector and a conductive tab electrically coupled to the electrical connector. The method further includes the step of molding a housing around at least a portion of the electrical assembly. The housing includes a first recessed portion and a second recessed portion on a mounting surface of the housing. The method further includes the step of forming a first contact pad configured to electrically couple to a first lead wire of a capacitor body through a casing of the capacitor body. The first contact pad is configured to provide a first terminal for electrically coupling to an electrical circuit. The method further includes the step of mounting the first contact pad to the first recessed portion of the housing. The method further includes the step of forming, from a portion of the conductive tab and in the second recessed portion of the housing, a second contact pad configured to electrically couple to a second lead wire of the capacitor body through the electrical connector and the conductive tab. The second contact pad is configured to provide a second terminal for electrically coupling to the electrical circuit.

These and other objects and advantages of the present disclosure will be recognized by one skilled in the art after having read the following detailed description, which are illustrated in the various drawing figures.

BRIEF DESCRIPTION OF THE DRAWINGS

A more detailed understanding may be had from the following description, given by way of example in conjunction with the accompanying drawings wherein.

DETAILED DESCRIPTION

Figure 1A:
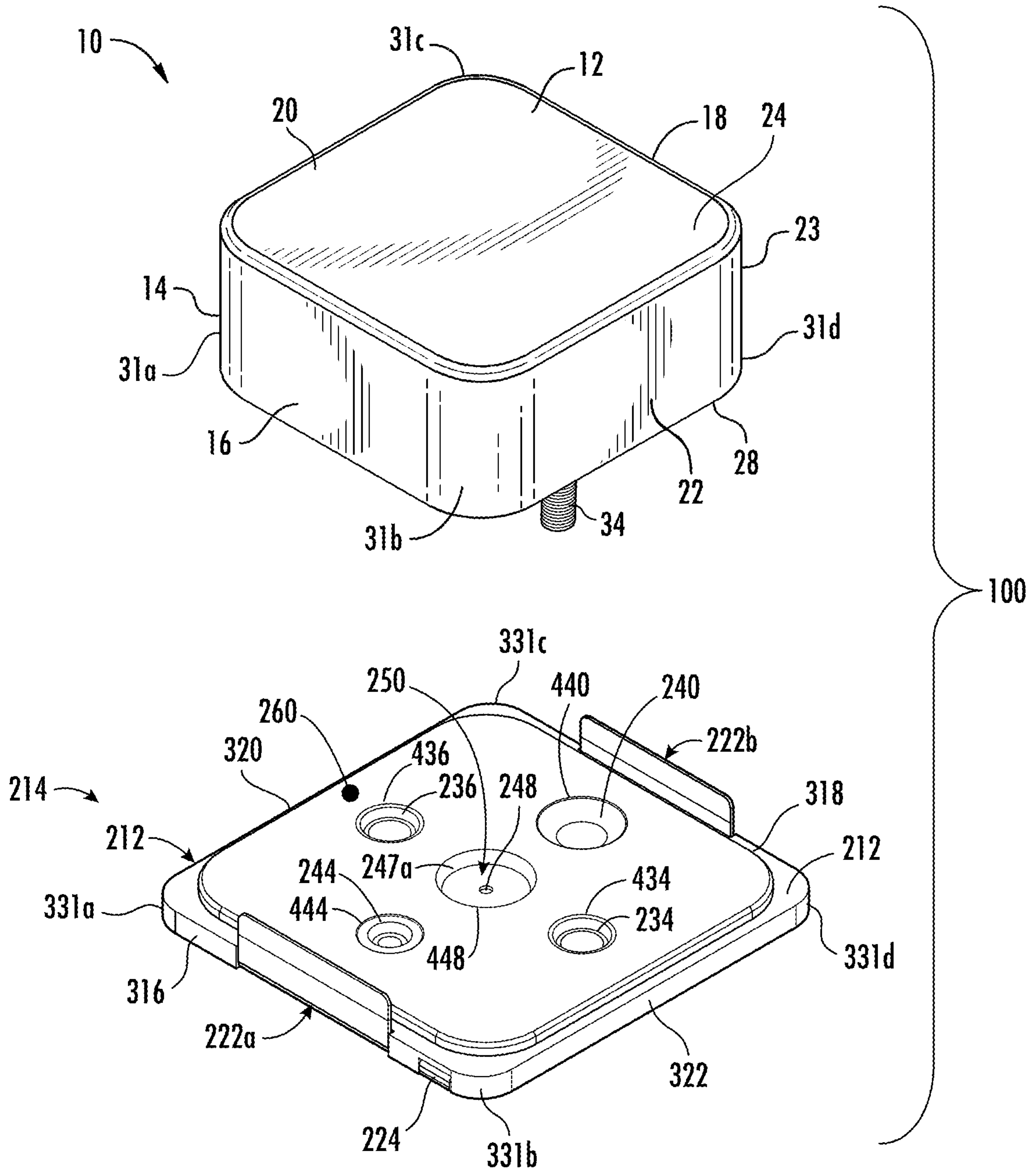
FIGS. 1A and 1B show perspective views of an example of a capacitor having a capacitor body and a base according to aspects of the disclosure.

Reference will now be made in detail to various aspects and/or embodiments of the disclosure, examples of which are illustrated in the accompanying drawings. While the disclosure will be described in conjunction with these aspects and/or embodiments, it is understood that they are not intended to limit the disclosure to these aspects and/or embodiments. On the contrary, the disclosure is intended to cover alternatives, modifications and equivalents, which may be included within the spirit and scope of the disclosure as defined by the appended claims. Furthermore, in the following detailed description of the disclosure, numerous specific details are set forth in order to provide a thorough understanding of the disclosure. However, it will be recognized by one of ordinary skill in the art that the disclosure may be practiced without these specific details. In other instances, well known methods, procedures, components, and circuits have not been described in detail as not to unnecessarily obscure aspects of the disclosure.

Certain terminology is used in the following description for convenience only and is not limiting. The words “right,” “left,” “top,” “bottom,” “upper,” and/or “lower” designate directions in the drawings to which reference is made. The words “a” and “one,” as used in the claims and in the corresponding portions of the specification, are defined as including one or more of the referenced item unless specifically stated otherwise. This terminology includes the words above specifically mentioned, derivatives thereof, and words of similar import. The phrase “at least one” followed by a list of two or more items, such as “A, B, or C,” means any individual one of A, B, or C, as well as any combination thereof. The terms “generally”, “about”, and the like refer to +/−10% of a specified value unless otherwise noted.

Figure 1B:
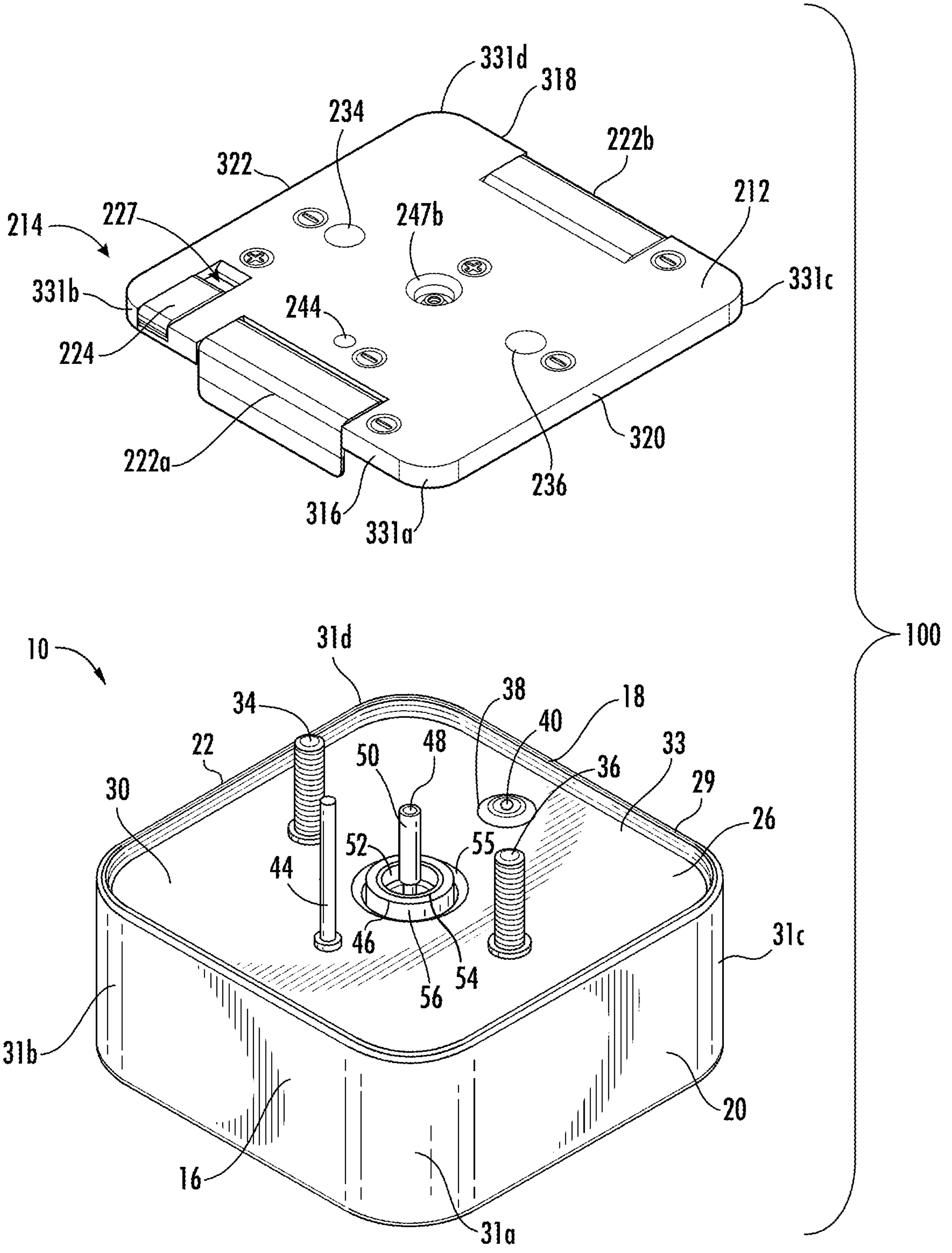

FIGS. 1A and 1B illustrate an example of a capacitor 100 according to an aspect of the disclosure, which may also be referred to as a "device" or "component." The capacitor 100 may include a capacitor body 10 that may be coupled to a base 214 via an adhesive layer 260, which may comprise double-sided adhesive tape or another adhesive material or mounting structure. As further discussed below, the capacitor body 10 is preferably a self-contained unit housing a plurality of plate members that are stacked with one another and filled with an electrolyte fluid. The capacitor body 10 may be designed as a self-contained unit that may be subsequently coupled to the base 214. The base 214 may be specially configured to receive the capacitor body 10. This arrangement may permit the base 214 to be fitted to a number of different capacitor bodies, or otherwise connected or mounted to different mounting surfaces as necessitated by the application in which the capacitor 100 may be used.

The base 214 may be "universal" in that it can be used to mount different capacitors, such as the capacitors shown for example in U.S. Pat. No. 11,742,149 "HERMETICALLY SEALED HIGH ENERGY ELECTROLYTIC CAPACITOR AND CAPACITOR ASSEMBLIES WITH IMPROVED SHOCK AND VIBRATION PERFORMANCE," the entire contents of which are incorporated by reference as if fully set forth herein. There are many advantages to the base 214 disclosed herein. In one example, the base 214 provides a universal base add-on to any of the capacitors described in U.S. Pat. No. 11,742,149, which will allow these radial capacitors to become (i) SMD-mountable, and (ii) a drop-in replacement for different SMD capacitors. In another example, the base 214 provides these functionalities in a simpler, less complex arrangement having fewer weld steps, making manufacturing less cumbersome, less expensive, and more efficient.

Various arrangements of component parts or sub-assemblies of the capacitor body 10 assembled according to aspects of the disclosure may be referred to each as a "capacitor assembly," or together as "capacitor assemblies." The capacitor body 10 is preferably a self-contained unit housing a plurality of plate members that are stacked with one another and filled with an electrolyte fluid. The outer arrangement of the capacitor body 10 can be seen in FIGS. 1A and 1B. As shown in FIGS. 1A and 1B, the capacitor body 10 includes a case 12. The case 12 may have an overall generally rectangular shape, although other shapes, including square, circular, and oblong, are also contemplated. The case 12 may generally include a first surface 24 (or "top" or "upper surface" or "upper side") as shown in the orientation of the capacitor body 10 in the Figures, although the capacitor may be mounted in a different orientation in use. The case 12 may generally include a wall 14 extending downwardly from the first surface 24, thereby forming sides or sidewalls of the case 12. The wall 14 is preferably a continuous component or uninterrupted wall. In a generally rectangular arrangement, the wall 14 may comprise a first side 16, and opposite second side 18, a third side 20 extending between the first side 16 and the second side 18, and an opposite fourth side 22 extending between the first side 16 and the second side 18. The case 12 comprises a conductive metal such as tantalum and/or another suitable material, such as niobium, titanium, or alloys of those. The case 12 may have corner areas 31*a*, 31*b*, 31*c*, 31*d*, as shown, including a corner area 31*a* disposed between the first side 16 and the third side 20, a corner area 31*b* disposed between the first side 16 and the fourth side 22, a corner area 31*c* disposed between the second side 18 and the third side 20, and a corner area 31*d* disposed between the second side 18 and the fourth side 22.

A first portion 23 of the case 12 includes the first surface 24 and the continuously extending wall 14, and may be generally formed in one piece having an initially open end 28 opposite the first surface 24 that is covered by a cover 30. The cover 30 is provided covering and extending across the open end 28, and forming a second surface 26 (or "lower surface" or "bottom surface" or "lower side") of the case 12. The cover 30 may comprise a conductive metal such as tantalum and/or another suitable material, such as niobium, titanium, or alloys of those. The case 12 including the cover 30 thus form or define an interior area configured to house internal components of the capacitor body 10. The cover 30 may be welded to the wall 14 to seal the case 12. The case 12 may sometimes be referred to as a "body" or "can." It is appreciated that any acceptable welding method can be used for the welded components and/or welding steps disclosed herein, such as resistance welding, laser welding, or another suitable welding technique. The case 12 may include an extended edge 29 that is adjacent to an extended edge 33 of the cover 30, as shown.

As shown for example in FIGS. 1A and 1B, the cover 30 may include mounting elements formed as an extending first screw weld stud 34 and an extending second screw weld stud 36. These may be employed to secure the capacitor 100 (including the capacitor body 10 and the base 214) to a mounting surface. A fill port 38 may be provided through the cover 30, allowing for the introduction of a fluid electrolyte. The fill port 38 may be positioned through the wall 14 or the first surface 24 in other contemplated arrangements. The fill port 38 may be sealed using a plug 40 and/or a tantalum ball. A cathode lead wire 44 may be provided as a pin or post extending from or otherwise attached to or welded to the cover 30.

As shown for example in FIGS. 1A and 1B, the cover 30 is further preferably provided with a glass-to-metal-seal (GTMS) 46. The GTMS 46 preferably includes an anode lead wire 48 therethrough that will form the external anode connection for the capacitor body 10. The anode lead wire 48 is generally formed from tantalum. An anode lead tube 50, which may be formed from nickel, nickel alloy, or any other solderable material, or another conductive metal, coaxially surrounds and electrically, directly contacts the anode lead wire 48. A performed glass insert 52 formed from a pressed glass surrounds the anode lead tube 50, insulating and isolating the anode lead wire 48 and the anode lead tube 50 from the case 12. A portion of the cover is formed, such as by punching or stamping, as an extended lip 54 or annular wall surrounding the glass insert 52. A compression seal 56 formed from stainless steel may be provided surrounding the extended lip 54 and sealing the GTMS 46 in place. The GTMS 46 acts to isolate the anode lead wire 48 from the case 12.

In the area surrounding an outer perimeter of the extended lip 54, the cover may have a recessed area 55, having portions extending toward the interior of the case 12. The compression seal 56 may be positioned in the recessed area 55, thereby allowing the compression seal 56 to rest in the recessed area and not extend beyond the extended edge 33 of the cover 30 or the extended edge 29 of the case 12, as shown.

The case 12 may be formed of tantalum and/or any other suitable type of conductive material such as a metal. The wall 14 and the cover 30 are preferably hermetically welded together to form an enclosure or interior area of the capacitor body 10.

Various arrangements of component parts or sub-assemblies of the base 214 assembled according to aspects of the disclosure may be referred to each as a "base assembly," or together as "base assemblies." The outer arrangement of the base 214 can be seen in FIGS. 1A and 1B. As shown, the base 214 includes a housing 212 which may also be referred to as a "body." The housing 212 may have an overall generally rectangular shape, although other shapes, including square, circular, and oblong, are also contemplated. The housing 212 may be formed from a plastic to be a supporting body for the components in the base 214 and the capacitor body 10. The housing 212 may comprise a first side 316, and opposite second side 318, a third side 320 extending between the first side 316 and the second side 318, and an opposite fourth side 322 extending between the first side 316 and the second side 318. The housing 212 may have corner areas 331*a*, 331*b*, 331*c*, 331*d*, as shown, including a corner area 331*a* disposed between the first side 316 and the third side 320, a corner area 331*b* disposed between the first side 316 and the fourth side 322, a corner area 331*c* disposed between the second side 318 and the third side 320, and a corner area 331*d* disposed between the second side 318 and the fourth side 322.

The base 214 may include first contact pads 222*a*, 222*b* and a second contact pad 224. The first contact pads 222*a*, 222*b* comprise negative terminals (e.g., two negative SMD terminals), and the second contact pad 224 comprises a positive terminal (e.g., a positive SMD terminal). The first contact pads 222*a*, 222*b* may be located on opposite sides of the base 214. As shown, the first contact pads 222*a*, 222*b* may include a first contact pad 222*a* arranged on the first side 316 of the housing 212 and a first contact pad 222*b* arranged on the second side 318 of the housing 212. The second contact pad 224 may be arranged on the same side of the base 214 as one of the first contact pads 222. As shown, the second contact pad 224 may be arranged on the first side 316 of the housing 212 adjacent to the first contact pad 222*a*. Each of the first contact pads 222*a*, 222*b* and the second contact pad 224 may be formed from nickel, nickel alloy, or any other solderable material, and include a selectively-plated region on a surface (e.g., a "bottom" or "lower" surface) that is selectively plated with tin, a tin alloy such as a tin-lead alloy (e.g., 60/40 tin/lead), or another solderable plating material.

Figure 6A:
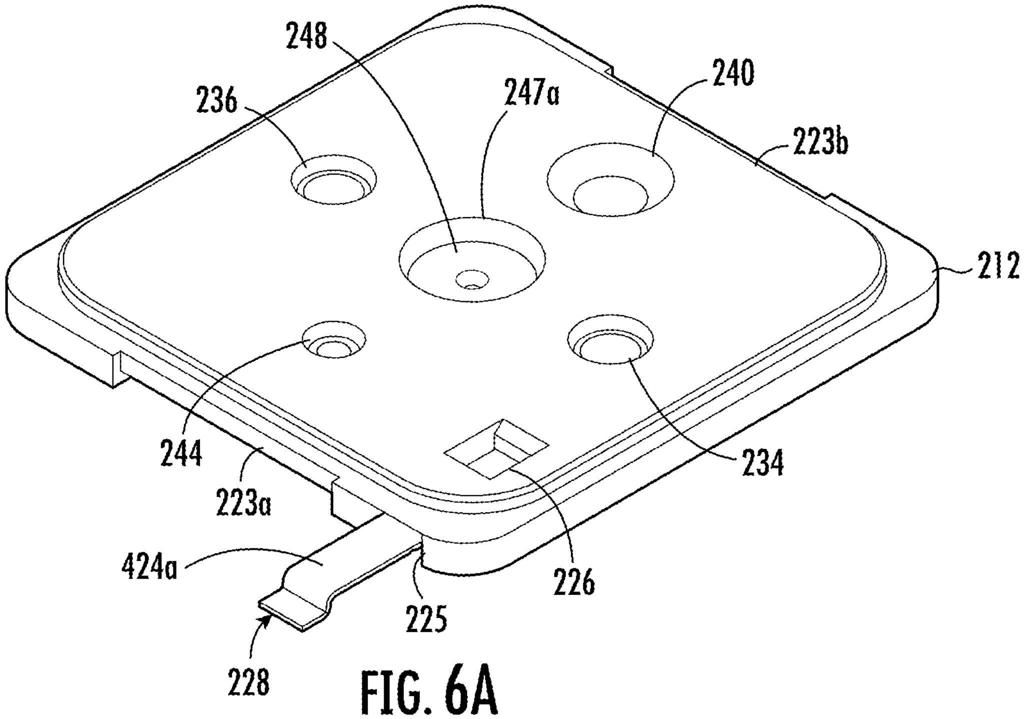
FIGS. 6A, 6B, 6C, and 6D show isometric, planar cut-away, and cross-sectional views of the forming of the housing of the base for the capacitor of FIG. 1A around the electrical assembly of FIG. 5A.
Figure 6B:
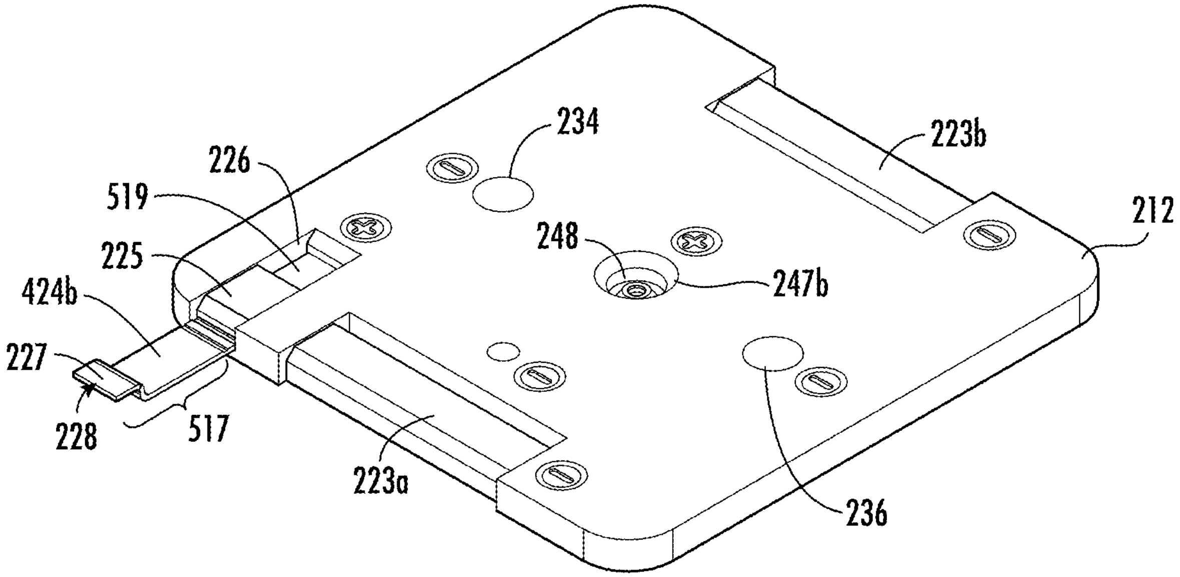
Figure 6C:
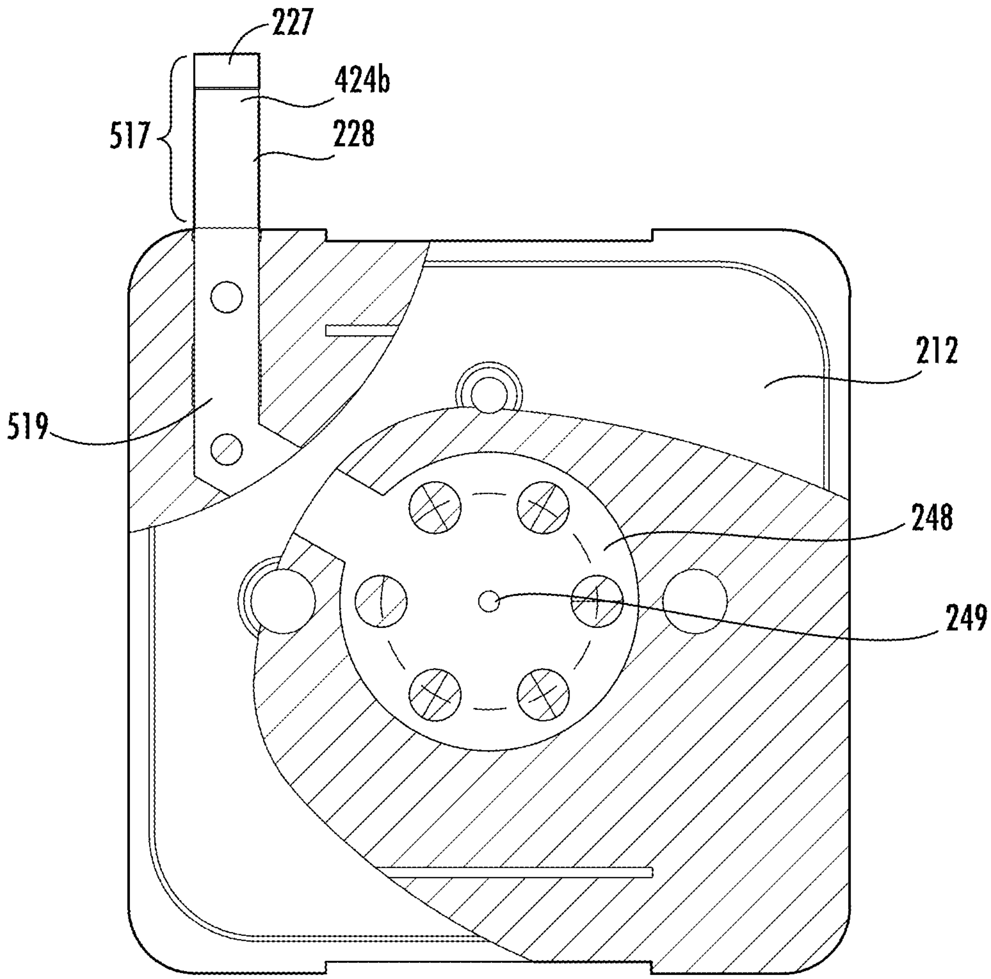
Figure 6D:
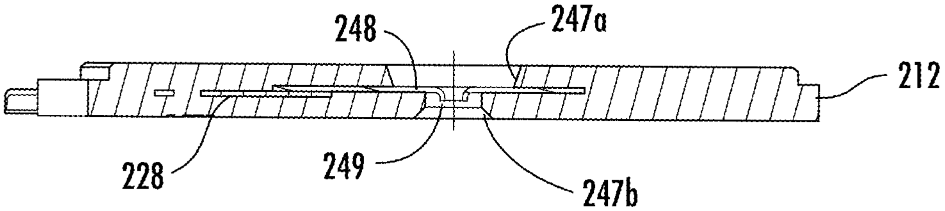

The housing 212 may include recessed portions 223*a*, 223*b* formed on the edge of the base 214 for disposing the first contact pads 222*a*, 222*b*, where each of the first contact pads 222*a*, 222*b* is disposed in a respective one of the recessed portions 223*a*, 223*b*. As shown in FIGS. 6A and 6B, housing 212 may include recessed portion 223*a* for disposing the first contact pad 222*a* and recessed portion 223*b* for disposing the first contact pad 222*b*.

The first contact pads 222 may be mounted and electrically coupled (e.g., welded) to the case 12 of the capacitor body 10 through electrical connection portions. The second contact pad 224 may be electrically insulated from the case 12 of the capacitor body 10 by an insulating material disposed between the second contact pad 224 and the case 12. The second contact pad 224 may be electrically coupled to the anode lead wire 48 through an electrical connector 248 and a conductive tab 228, for example shown in FIGS. 2, 5A and 5B. In some aspects, the SMD portions (e.g., the "bottom" portions) of the first contact pads 222*a*, 222*b* and second contact pad 224 may be plated with an electrically conductive material such as tin, a tin alloy (e.g., a tin-lead alloy), or any other solderable plating material.

The electrical connector 248, shown for example in FIGS. 2, 3A-3C, 5A and 5B, may be formed of any suitable type of material, such as tantalum, niobium, and titanium, or a suitable conductive metal. Preferably, the electrical connector 248 may be formed as a tantalum disk. It is appreciated that the electrical connector 248 may be formed in any shape and may be sized as a circular plate or disc, rectangular plate, a square plate, a triangular plate, a polygonal plate (e.g., a hexagonal plate), an oblong plate, or any selected shape, so long as the anode lead wire 48 can be electrically connected to such a plate configuration in order to provide electrical communication between the anode lead wire 48 and the second contact pad 224 through conductive tab 228. When provided as a circulate plate, the electrical connector 248 may be referred to as a "disk connector" or "disk connector plate."

The first contact pads 222*a*, 222*b* and the second contact pad 224 may connect the capacitor 100 to various types of electronic circuitry. Each of the first contact pads 222*a*, 222*b* may have a generally right angle, L-shaped, or J-shaped cross-section, and may be electrically coupled to the case 12 of the capacitor body 10. The second contact pad 224 may also have a generally folded-over, bent-over, C-shaped, or U-shaped cross-section, and may be electrically isolated from the case 12. As shown, each of the first contact pads 222*a*, 222*b* has a J-shaped cross-section, and the second contact pad 224 has a C-shaped cross-section.

The capacitor 100 may also include connection leads for connecting to various types of electronic circuitry. The connection leads may include a cathode lead wire 44 and an anode lead wire 48. The cathode lead wire 44 may comprise a negative wire, and the anode lead wire 48 may comprise a positive wire. The cathode lead wire 44 may be electrically coupled to the first contact pads 222*a*, 222*b*, and the anode lead wire 48 may be electrically coupled to the second contact pad 224.

As shown, the cathode lead wire 44 and the anode lead wire 48 may extend outwardly from the capacitor body 10 and pass through the base 214 of the capacitor 100. For example, the cathode lead wire 44 may extend outwardly from capacitor body 10, the housing 212 of the base 214 may include a pass-through portion 244 defining an aperture through which the cathode lead wire 44 is arranged to pass through, and the adhesive layer 260 may include a pass-through portion 444 defining an aperture through which the cathode lead wire 44 is arranged to pass through. As shown in FIG. 1B, the anode lead wire 48 may extend outwardly from capacitor body 10, and, as shown in FIG. 1A, a first surface (e.g., "top" or "upper" surface) of the housing 212 of the base 214 may include a recessed portion 247*a* formed around the electrical connector 248 into which a shield 250 is mounted. As shown in FIG. 1B, a second surface (e.g., "bottom" or "lower" surface) of the housing 212 of the base 214 may include a recessed portion 247*b* formed around the electrical connector 248. As shown in FIGS. 3A-7E, the electrical connector 248 may include a pass-through portion 249 defining an aperture through which the anode lead wire 48 is arranged to pass through and to be in electrical connection with (e.g., the anode lead wire 48 may be welded to the edge 749 (shown in FIGS. 3A-3C and 11C) of the pass-through portion 249 of the electrical connector 248 along the circumference of the anode lead wire 48), the shield 250 may include a pass-through portion 251 defining an aperture through which the anode lead wire 48 is arranged to pass through, and the adhesive layer 260 may include a pass-through portion 448 defining an aperture through which the anode lead wire 48 is arranged to pass through.

The shield 250 may be formed of any suitable type of material, such as polytetrafluoroethylene (PTFE) or another non-conductive and/or insulative material. The shield 250 insulates the electrical connector 248, and the anode lead wire 48 welded thereto, from adjacent components. Preferably, the shield 250 may be formed as a PTFE disk. It is appreciated that the shield 250 may be formed in any shape and may be sized as a circular plate or disc, rectangular plate, a square plate, a triangular plate, a polygonal plate (e.g., a hexagonal plate), an oblong plate, or any selected shape, so long as the anode lead wire 48 and the electrical connector 248 can be electrically isolated from other components by such a plate configuration. When provided as a circulate plate, the shield 250 may be referred to as a "disk shield" or "disk shield plate."

As shown, the cathode lead wire 44 and the anode lead wire 48 may have circular cross-sections. However, alternative implementations are possible in which one or more of the cathode lead wire 44 and the anode lead wire 48 have different cross-sections, such as a rectangular cross-section. Although the cathode lead wire 44 and the anode lead wire 48 are shown to have different thicknesses, alternative implementations are possible in which the cathode lead wire 44 and the anode lead wire 48 have the same thickness.

As shown, the capacitor 100 may further include one or more threaded studs for affixing the capacitor 100 to a printed circuit board (PCB) or other mounting surface. The one or more threaded studs may include an extending first screw weld stud 34 and an extending second screw weld stud 36. The extending first screw weld stud 34 and the extending second screw weld stud 36 may extend outwardly from the capacitor body 10 and pass through the base 214 of the capacitor 100. For example, the extending first screw weld stud 34 may extend outwardly from capacitor body 10, the housing 212 of the base 214 may include a pass-through portion 234 defining an aperture through which the extending first screw weld stud 34 is arranged to pass through, and the adhesive layer 260 may include a pass-through portion 434 defining an aperture through which the extending first screw weld stud 34 is arranged to pass through. The extending second screw weld stud 36 may extend outwardly from capacitor body 10, the housing 212 of the base 214 may include a pass-through portion 236 defining an aperture through which the extending second screw weld stud 36 is arranged to pass through, and the adhesive layer 260 may include a pass-through portion 436 defining an aperture through which the extending second screw weld stud 36 is arranged to pass through. In some aspects, each of the first ends (e.g., "top" or "upper" ends) of the extending first screw weld stud 34 and the extending second screw weld stud 36 may be affixed (e.g., connected, joined, or otherwise attached) to one or more nuts, washers, and/or threaded inserts disposed in the capacitor body 10. Additionally or alternatively, each of the first ends of the extending first screw weld stud 34 and the extending second screw weld stud 36 may be welded, glued, or otherwise affixed (e.g., connected, joined, or otherwise attached) to one or more screw mounting structures disposed in the capacitor body 10.

As shown, the extending first screw weld stud 34 and the extending second screw weld stud 36 may be situated on opposite sides of the anode lead wire 48 and have the same length. However, alternative implementations are possible in which the one or more threaded studs are situated at different locations along the capacitor body 10 and/or the base 214, and/or have different lengths. The cathode lead wire 44 and the anode lead wire 48 may also be situated at different locations on the base 214. The present disclosure is not limited to any location, shape, material, and physical dimensions for the first contact pads 222*a*, 222*b*, the second contact pad 224, the cathode lead wire 44, anode lead wire 48, the extending first screw weld stud 34, and the extending second screw weld stud 36. Furthermore, in some implementations, the cathode lead wire 44 and the anode lead wire 48, or the extending portions thereof, may be omitted to facilitate the stacking of the capacitor 100 over other capacitors.

The housing 212 may include a recessed portion 240 formed on the surface of the base 214 for disposing the plug 40. As shown, the plug 40 may extend outwardly from capacitor body 10 when the fill port 38 is sealed by the plug 40, the housing 212 of the base 214 may include a recessed portion 240 into which the plug 40 is arranged to extend, and the adhesive layer 260 may include a pass-through portion 440 defining an aperture through which the plug 40 is arranged to pass through.

Figure 2:
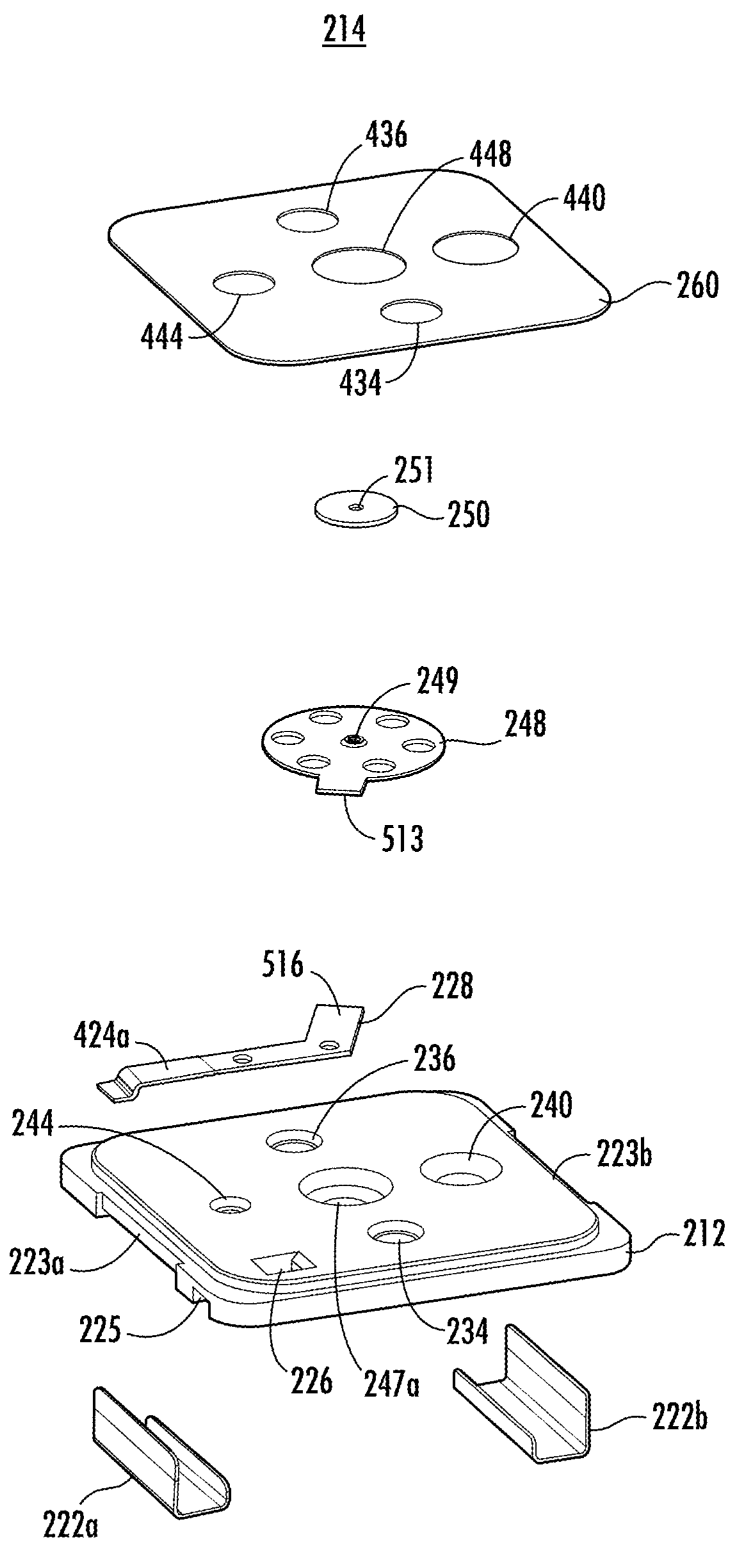
FIG. 2 shows an exploded isometric view of the base of the capacitor of FIG. 1A.

FIG. 2 shows an exploded isometric (top) view of the base 214 of the capacitor 100. As shown in FIG. 2, the base 214 includes first contact pads 222*a* and 222*b*, second contact pad 224, electrical connector 248, housing 212 (e.g., integrally formed around electrical connector 248), shield 250, and adhesive layer 260. The housing 212 includes recessed portions 223*a* and 223*b*, recessed portion 225, opening portion 226, recessed portion 240, recessed portions 247*a* (shown) and 247*b* (not shown), and pass-through portions 234, 236, and 244. The electrical connector 248 includes pass-through portion 249. The conductive tab 228 includes second contact pad 224. Each of the first contact pads 222*a* and 222*b* has a generally J-shaped cross-section. The shield 250 includes pass-through portion 251. The adhesive layer 260 includes pass-through portions 434, 436, 440, 444, and 448.

Figure 3A:
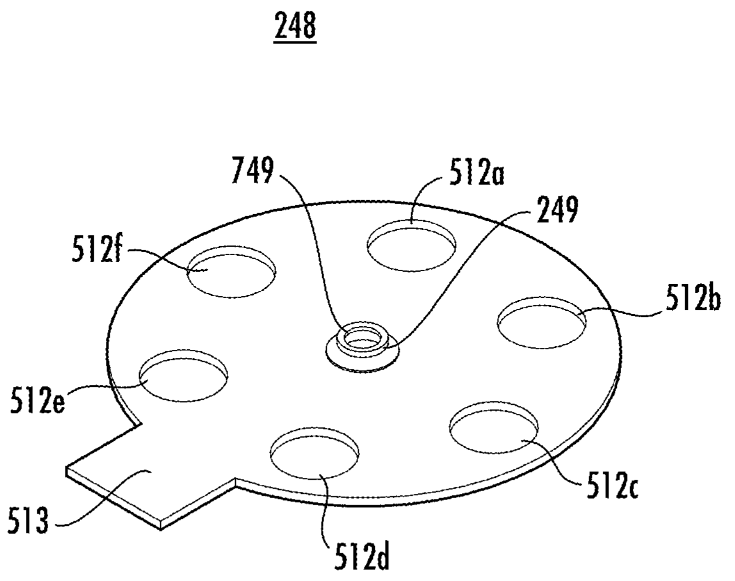
FIGS. 3A, 3B, and 3C show isometric, planar, and cross-sectional views of an electrical connector of the base of the capacitor of FIG. 1A.
Figure 3B:
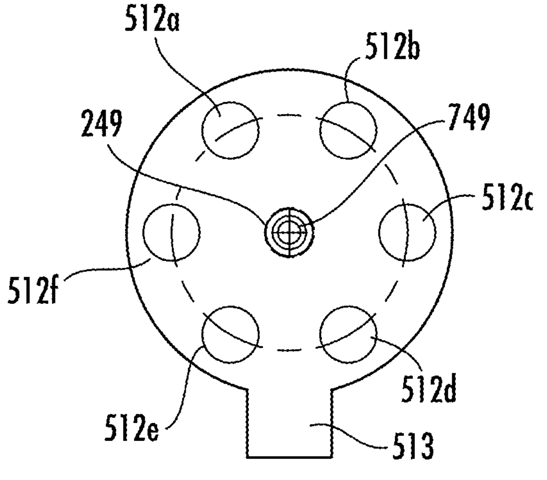
Figure 3C:
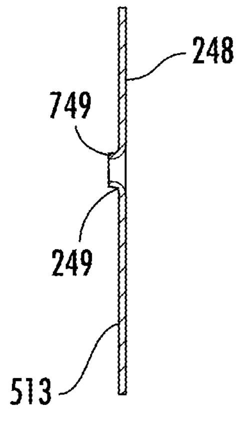

FIGS. 3A, 3B, and 3C show isometric (bottom), planar (bottom), and cross-sectional views, respectively, of the electrical connector 248. As shown in FIGS. 3A, 3B, and 3C, the electrical connector 248 includes a pass-through portion 249 to which the anode lead wire 48 is preferably arranged to be welded and defining an aperture through which the anode lead wire 48 is preferably arranged to pass through. As shown, the electrical connector 248 also includes stabilizing portions 512*a*, 512*b*, 512*c*, 512*d*, 512*e*, and 512*f* defining apertures through which the housing 212 may be integrally formed to support the electrical connector 248. The stabilizing portions 512*a*, 512*b*, 512*c*, 512*d*, 512*e*, and 512*f* are arranged to be filled with epoxy or another suitable material when the housing 212 is formed and form a locking mechanism to reduce or substantially prevent movement of the electrical connector 248 within the base 214. The electrical connector 248 also includes an extended portion 513 for mounting the electrical connector 248 to the conductive tab 228.

Figure 4A:
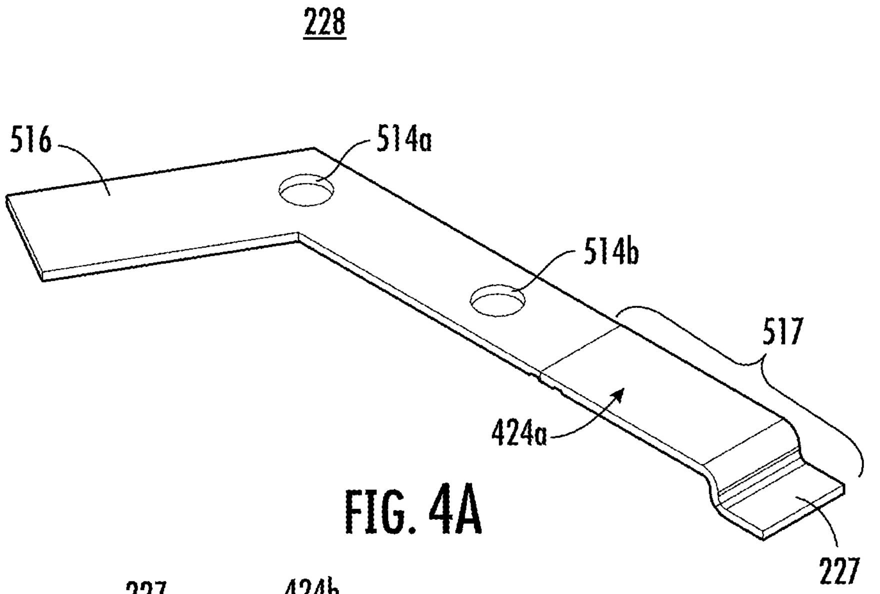
FIGS. 4A, 4B, and 4C show isometric and side views of a conductive tab of the base of the capacitor of FIG. 1A.
Figure 4B:
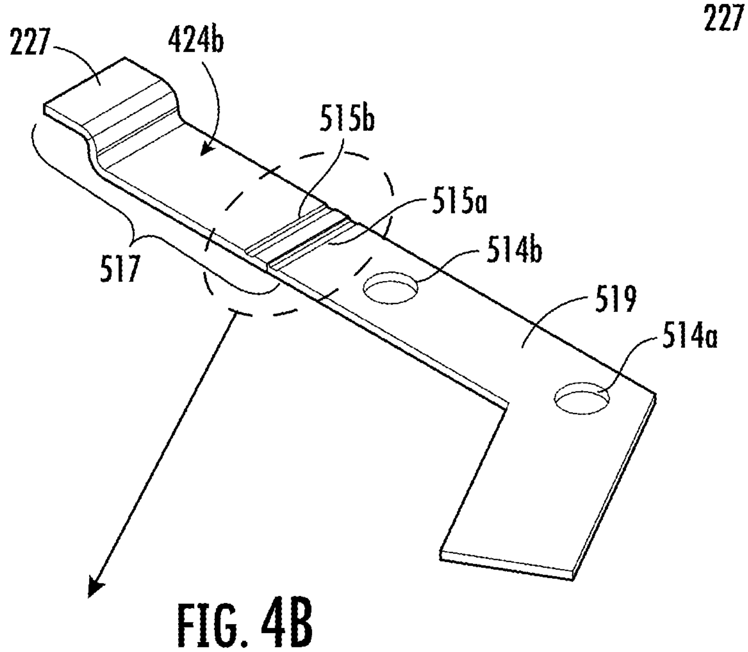
Figure 4C:
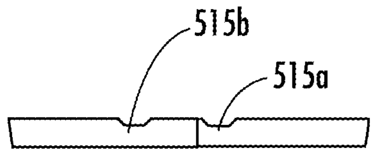

FIGS. 4A, 4B, and 4C show isometric (top), isometric (bottom), and side views, respectively, of the conductive tab 228. As shown in FIGS. 4A, 4B, and 4C, the conductive tab 228 which may be formed from nickel, nickel alloy, or any other solderable material, includes a plated region 424*a* that is configured to be folded over (as shown in FIGS. 7A, 7B, 7C, 7D, and 7E) to form the second contact pad 224. A region 424*b* is disposed opposite the plated region 424*a* adjacent to notches 515*a* and 515*b* on the underside of the conductive tab 228. The plated region 424*a* preferably is plated with an electrically conductive material, such as tin, a tin alloy (e.g., a tin-lead alloy), or any other solderable plating material, while the region 424*b* is optionally plated with an electrically conductive material. The notches 515*a* and 515*b* are configured to facilitate the bending of the conductive tab 228 to form the second contact pad 224. As shown, the conductive tab 228 also includes stabilizing portions 514*a* and 514*b* defining apertures through which the housing 212 may be integrally formed to support the conductive tab 228. The stabilizing portions 514*a* and 514*b* are arranged to be filled with epoxy or another suitable material when the housing 212 is formed and form a locking mechanism to reduce or substantially prevent movement of the conductive tab 228 within the base 214. The conductive tab 228 also includes an extended portion 516 for mounting the conductive tab 228 to the electrical connector 248. The conductive tab 228 also includes an end portion 227, an end region 517, and an interior portion 519 for use in forming the second contact pad. As shown in FIGS. 7A-7E, the second contact pad 224 may be formed in the recessed portion 225 of the housing 212 by bending the end region 517 of the conductive tab 228 at the notches 515*a*, 515*b* into the recessed portion 225 of the housing 212 and affixing (e.g., welding) the end portion 227 of the conductive tab 228 to the interior portion 519 of the conductive tab 228 exposed by a window defined by the opening portion 226 of the housing 212.

Figure 5A:
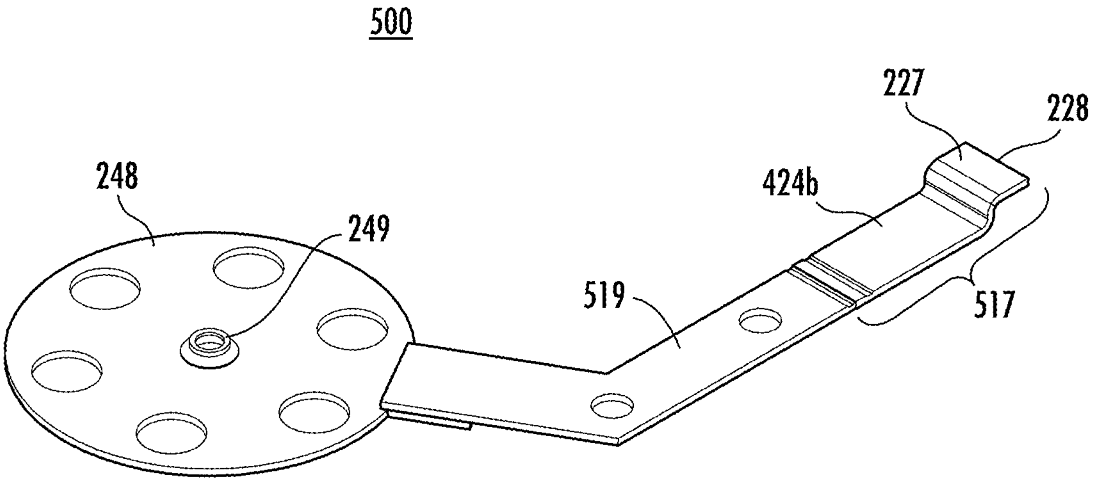
FIGS. 5A and 5B show isometric and side views of an electrical assembly that includes the electrical connector of FIG. 3A and the conductive tab of FIG. 4A.
Figure 5B:
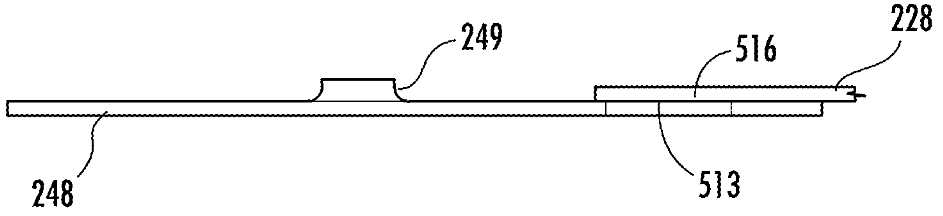

FIGS. 5A and 5B show isometric (bottom) and side views, respectively, of an electrical assembly 500 that includes the electrical connector 248 and conductive tab 228. As shown, the extended portion 513 of the electrical connector 248 is affixed (e.g., welded) to the extended portion 516 of the conductive tab 228 to form the electrical assembly 500.

FIGS. 6A, 6B, 6C, and 6D show isometric (top), isometric (bottom), planar cut-away (top), and cross-sectional views, respectively, of the housing 212 formed, for example molded, around the electrical assembly 500 and including the features and functionality of the housing 212 described herein.

Figure 7A:
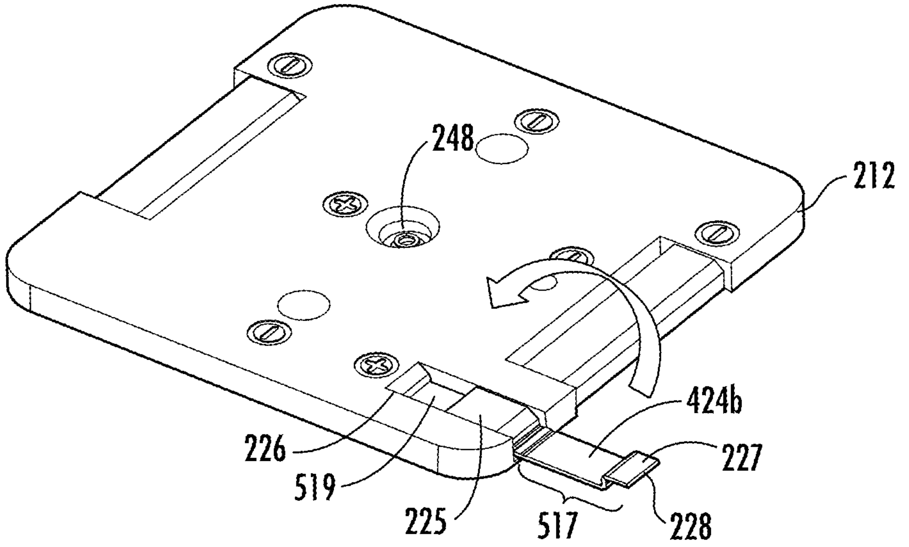
FIGS. 7A, 7B, 7C, 7D, and 7E show isometric and cross-sectional views of the forming of the second contact pad of the base for the capacitor of FIG. 1A.
Figure 7B:
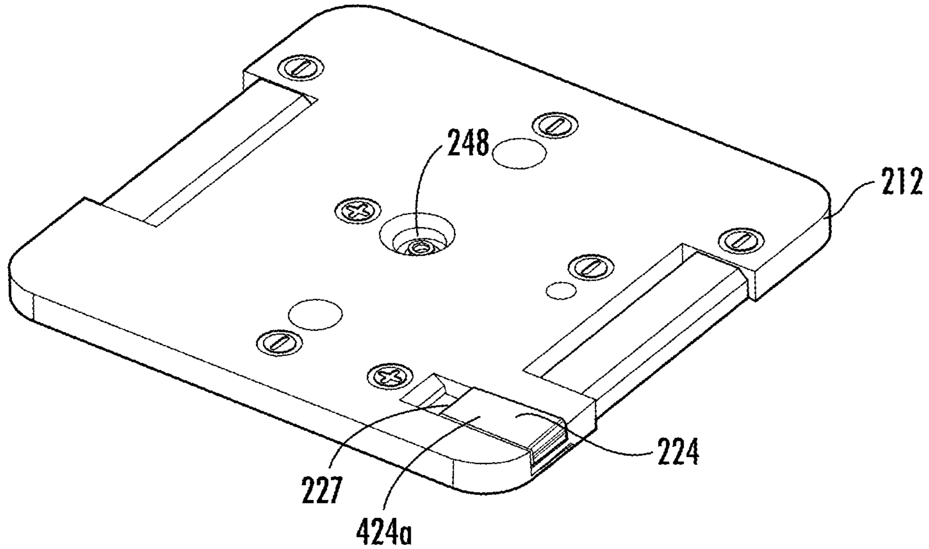
Figure 7C:
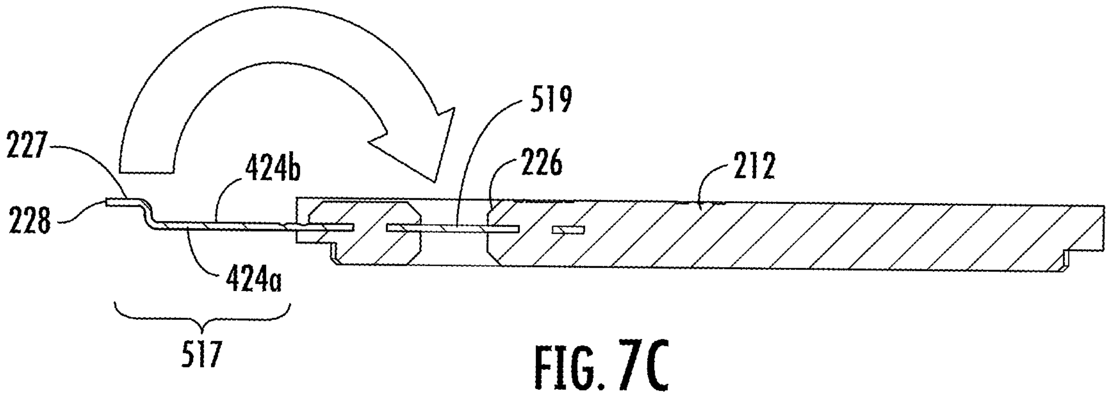

FIGS. 7A and 7C show isometric (bottom) and cross-sectional views, respectively, of the housing 212 before a portion of the conductive tab 228 is bent to form the second contact pad 224. As shown, the housing 212 has been formed around the electrical assembly 500 that includes the electrical connector 248 affixed (e.g., connected, joined, or otherwise attached) to the conductive tab 228. A portion of the conductive tab 228 is bent at the notches 515*a*, 515*b* in a direction toward a second surface (e.g., "bottom" or "lower" surface) of the housing 212 to form second contact pad 224.

Figure 7D:
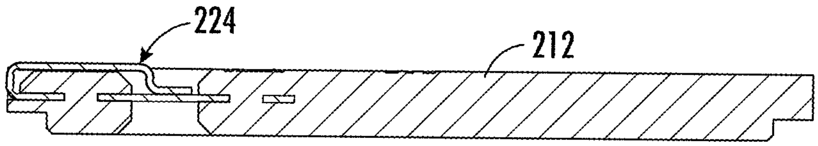
Figure 7E:
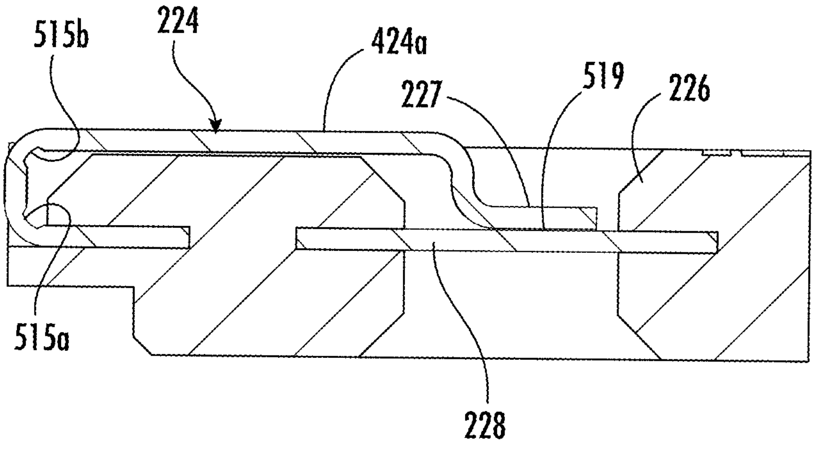

FIGS. 7B and 7D show isometric (bottom) and cross-sectional views, respectively, of the housing 212 after the portion of the electrical connector 248 is bent to form the second contact pad 224. FIG. 7C shows a detailed cross-sectional view of the second contact pad 224. An end portion 227 of the conductive tab 228 is welded to an interior portion of the conductive tab 228 exposed by the opening portion 226 in the housing 212.

Figure 8:
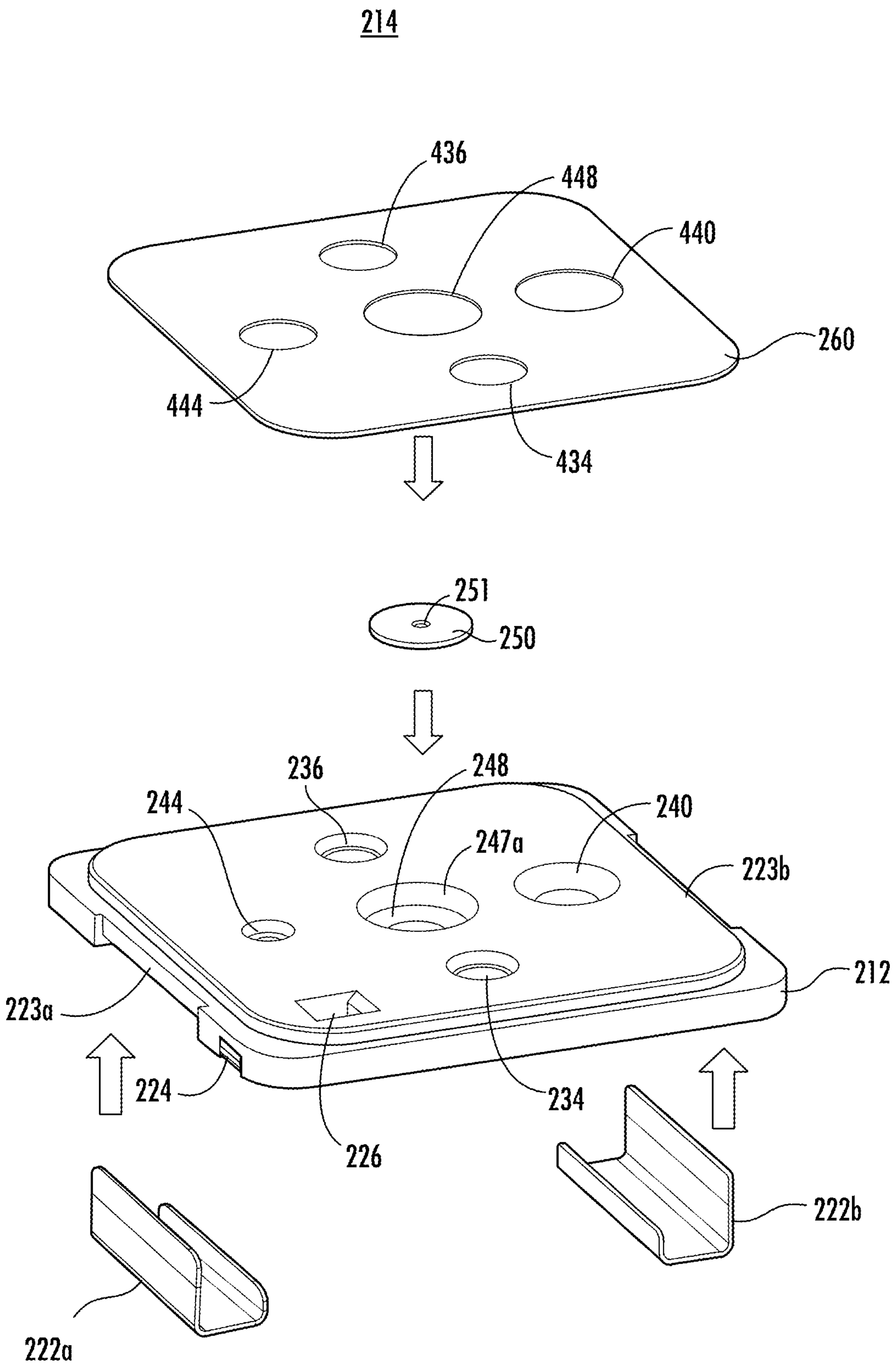
FIG. 8 shows an exploded isometric view of the base for the capacitor of FIG. 1A.

FIG. 8 shows an exploded isometric (top) view of the base 214. As shown, the shield 250 is mounted in the recessed portion 247*a* of the housing 212 and affixed (e.g., connected, joined, or otherwise attached) to the electrical connector 248, the first contact pads 222*a* and 22*b* are mounted to the recessed portions 223*a* and 223*b*, respectively, of the housing 212, and the adhesive layer 260 is mounted to the surface (e.g., the "top" or "upper" surface) of the housing 212.

Figure 9A:
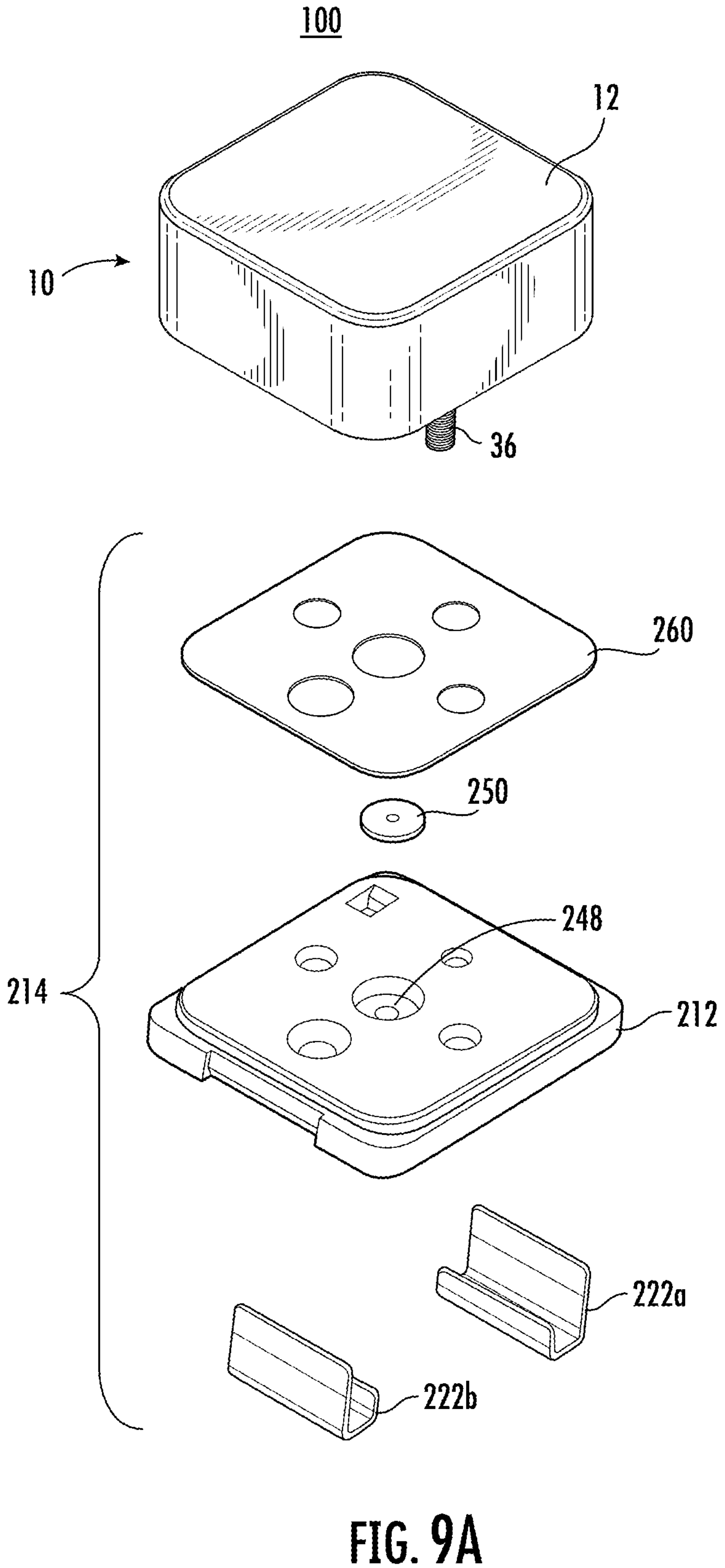
FIGS. 9A and 9B show exploded isometric views of the capacitor body and base of FIG. 1A.
Figure 9B:
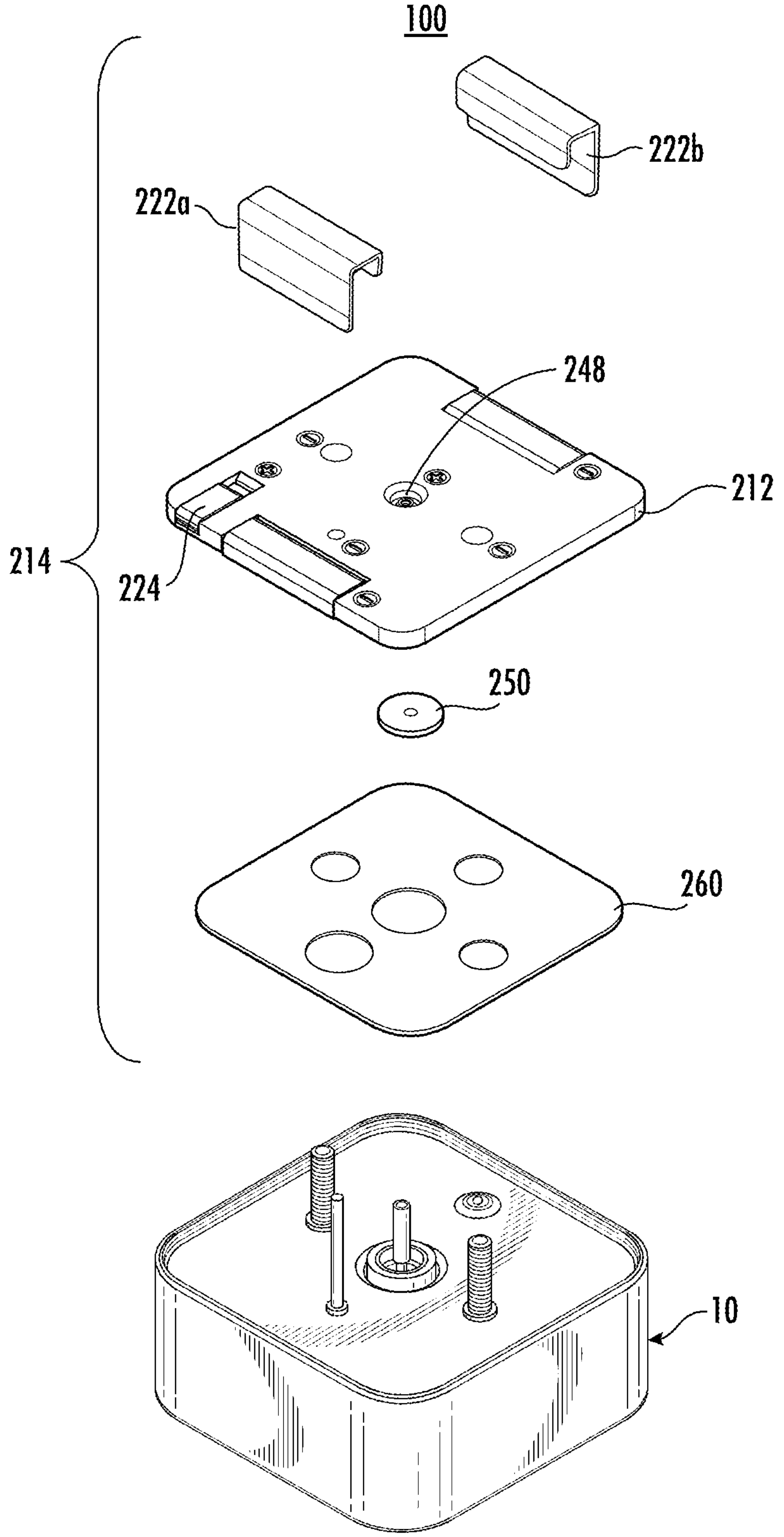

FIGS. 9A and 9B show exploded isometric (top) and exploded isometric (bottom) views, respectively, of the capacitor 100. As shown in FIGS. 9A and 9B, the capacitor 100 includes capacitor body 10 and base 214. The capacitor body 10 includes case 12, cathode lead wire 44, anode lead wire 48, plug 40 (e.g., sealing the fill port 38), extending first screw weld stud 34, and extending second screw weld stud 36. The base 214 includes housing 212, first contact pads 222*a* and 222*b*, second contact pad 224, conductive tab 228, electrical connector 248, shield 250, and adhesive layer 260.

Figure 10A:
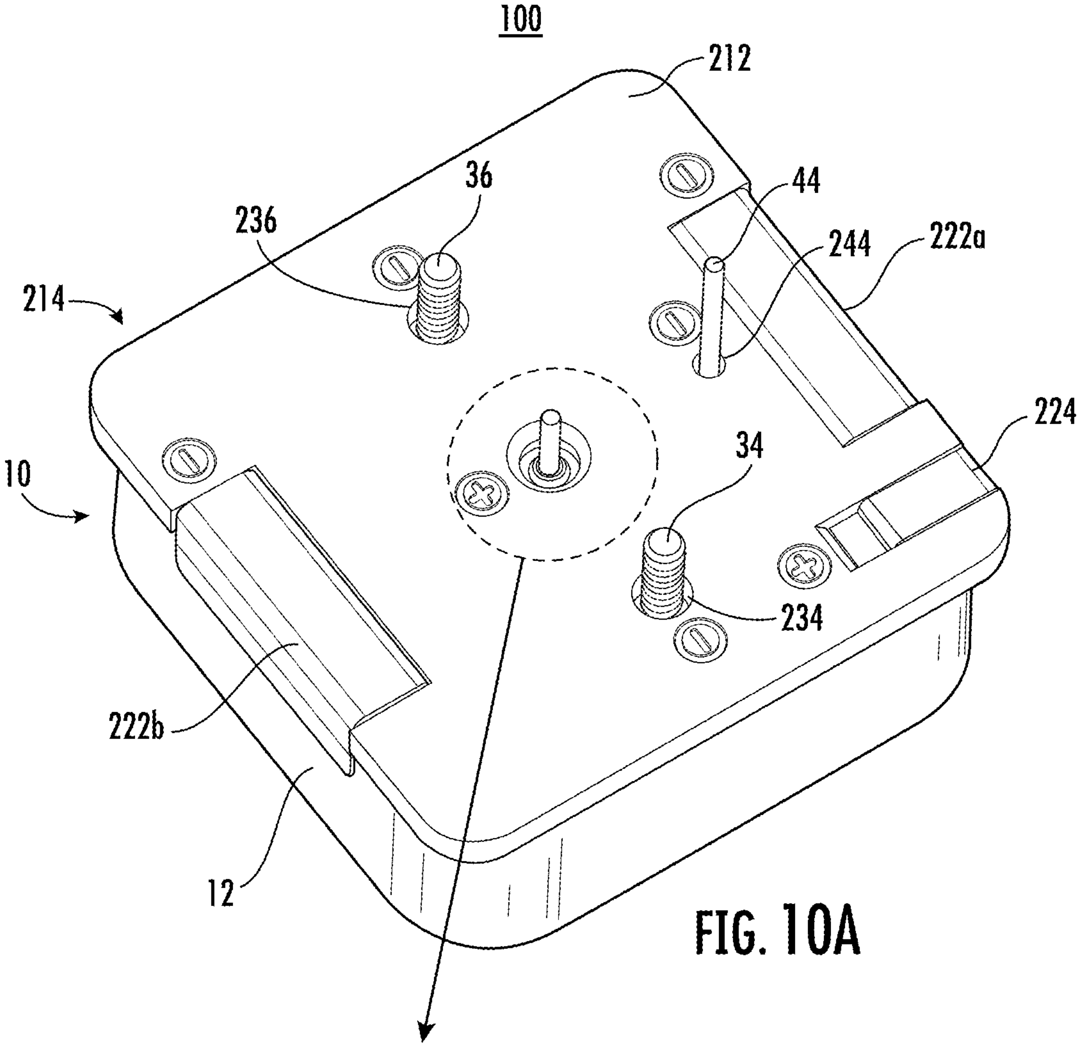
FIGS. 10A and 10B show assembled isometric views of the capacitor of FIG. 1A showing the connection of the electrical assembly to the anode lead of the capacitor.
Figure 10B:
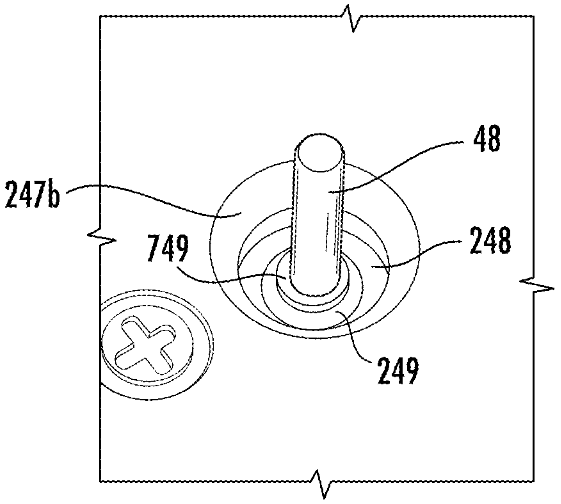

FIGS. 10A and 10B show assembled isometric (bottom) views of the capacitor 100 showing the connection of the electrical connector 248 of the electrical assembly 500 to the anode lead wire 48 of the capacitor body 10. In the arrangement shown in FIGS. 10A and 10B, elements such as the anode lead tube 50, compression seal 56, GTMS 46, etc. have been removed to show more clearly the electrical connection of the electrical connector 248 to the anode lead wire 48.

As shown in FIG. 10A, the capacitor 100 includes capacitor body 10 and base 214. The capacitor body 10 includes case 12, cathode lead wire 44, anode lead wire 48, extending first screw weld stud 34, and extending second screw weld stud 36. The base 214 includes housing 212, first contact pads 222*a* and 222*b*, second contact pad 224, electrical connector 248. The housing 212 includes recessed portion 247*b* formed around the electrical connector 248 and that defines an electrical contact opening for the pass-through portion 249 of the electrical connector 248. The housing also includes pass-through portions 234, 236, and 244 defining apertures through which the extending first screw weld stud 34, the extending second screw weld stud 36, and the cathode lead wire 44, respectively, are arranged to pass through. As shown in FIGS. 10A and 10B, a pass-through portion 249 of the electrical connector 248 is welded to the anode lead wire 48 and defines an aperture through which the anode lead wire 48 passes through.

Various internal components of a capacitor 100 according to aspects of the disclosure are now described in further detail. In some aspects, these components may be configured to provide improved shock and vibration resistance. A capacitor including components configured to provide improved shock and vibration resistance is shown for example in U.S. Pat. No. 11,742,149 "HERMETICALLY SEALED HIGH ENERGY ELECTROLYTIC CAPACITOR AND CAPACITOR ASSEMBLIES WITH IMPROVED SHOCK AND VIBRATION PERFORMANCE," the entire contents of which is incorporated by reference as if fully set forth herein.

Figure 11A:
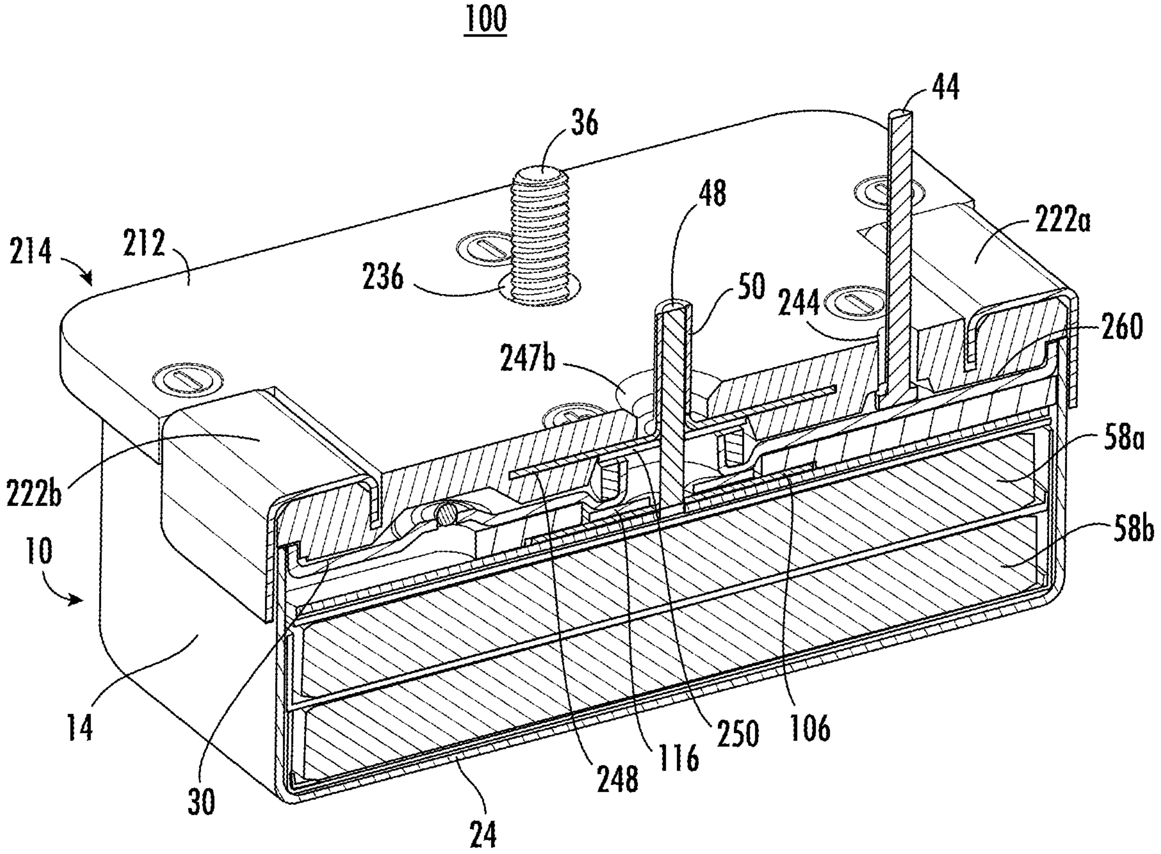
FIGS. 11A, 11B, and 11C show assembled isometric cut-away and cross-sectional views of the assembled capacitor body and base of FIG. 1A.
Figure 11B:
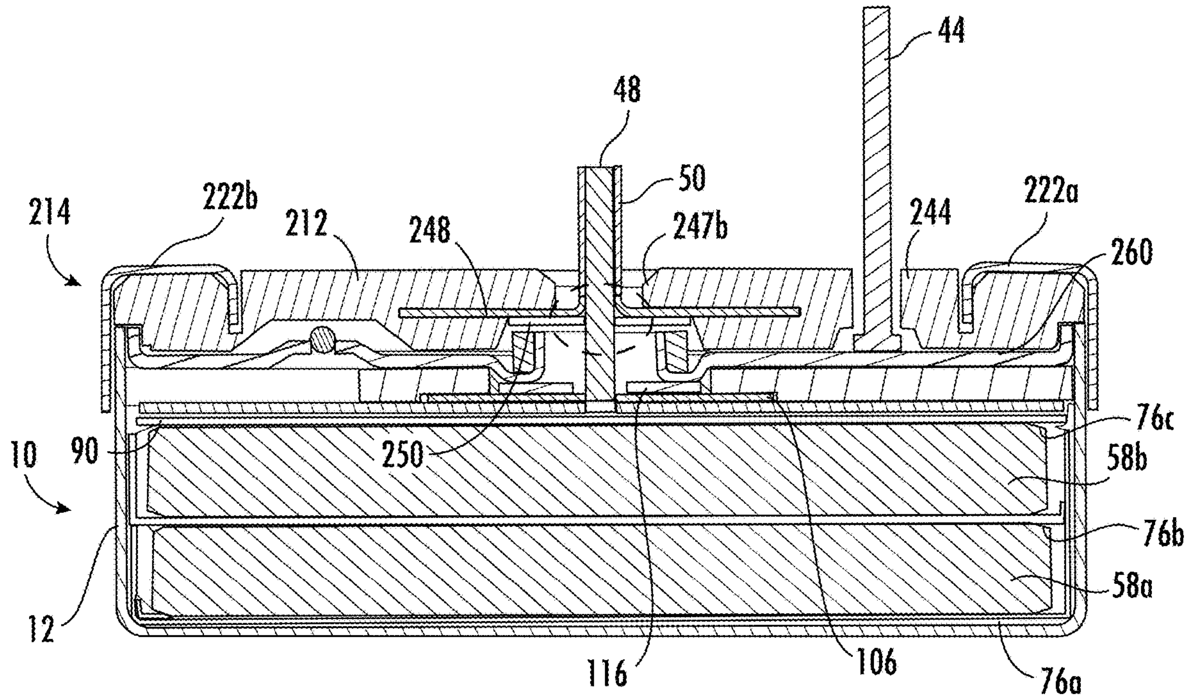
Figure 11C:
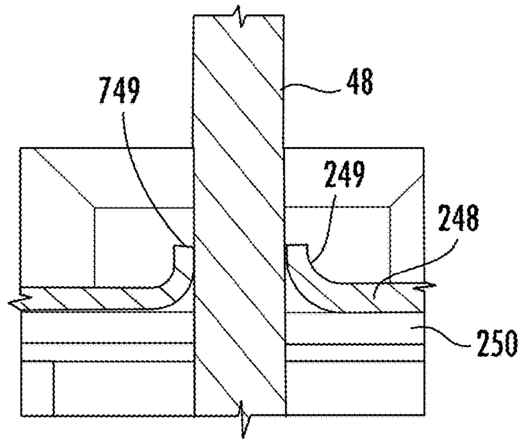
Figure 12:
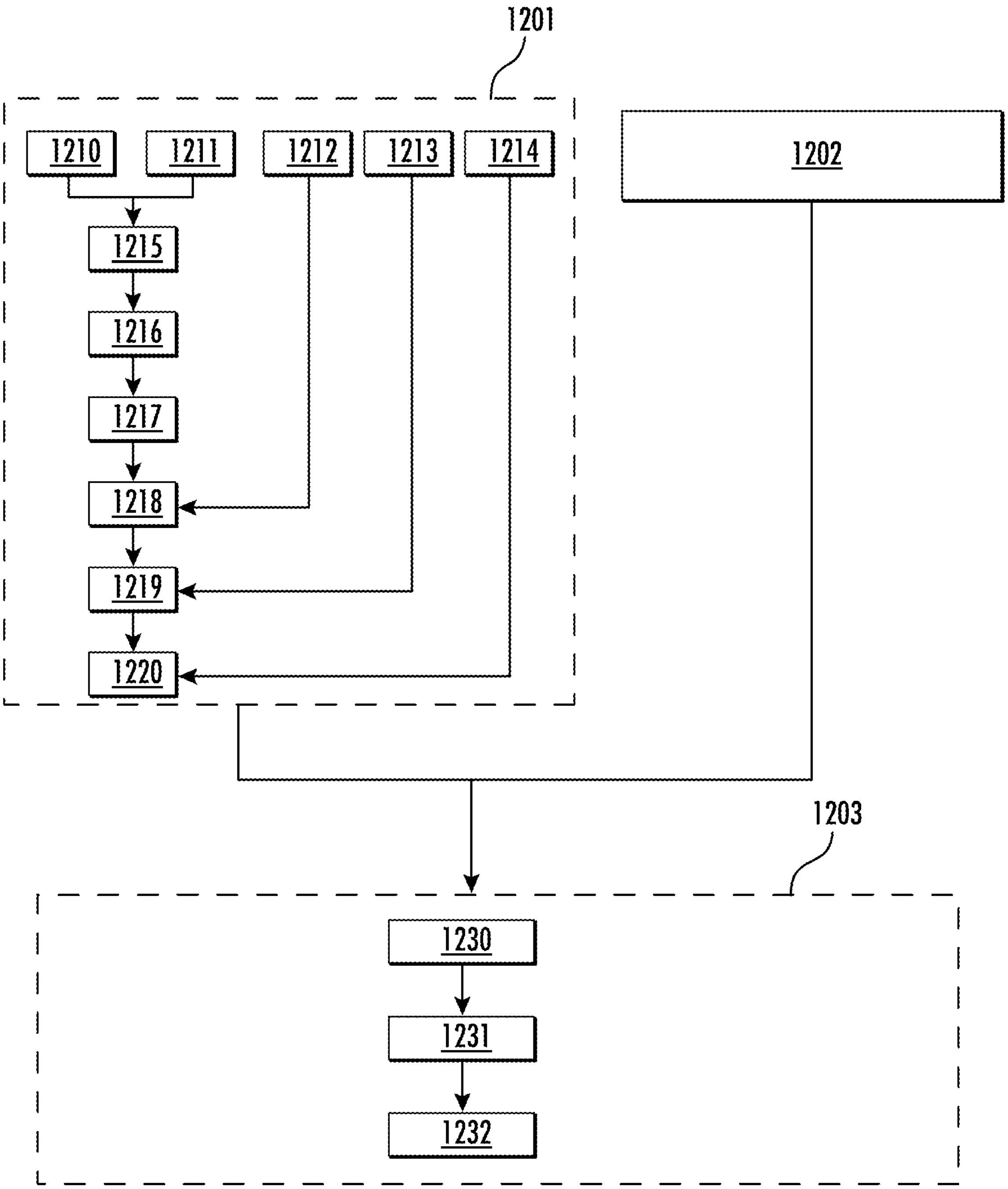
FIG. 12 shows a flow chart with an example of a process of forming a capacitor according to aspects of the disclosure.

FIGS. 11A, 11B, and 11C show assembled isometric cut-away (bottom) and cross-sectional views of the capacitor 100. In the arrangement shown in FIGS. 11A, 11B, and 11C, elements such as the compression seal 56, GTMS 46, etc. have been removed to show more clearly the electrical connection of the electrical connector 248 to the anode lead wire 48.

FIGS. 11A and 11B show an example of anode plates, or anode plate members, or simply anodes, generally referenced as anode plates 58. In an example of a capacitor having multiple anode plates 58, a capacitor according to an aspect of the disclosure may include two anode plates, shown as a first anode plate 58*a* and a second anode plate 58*b*. Thus, a capacitor body 10 according to an aspect of the disclosure provides a multi-anode plate arrangement. In some aspects, the anode plates 58 may form a capacitor stack assembly, or capacitor stack, or capacitor assembly stack. A capacitor stack assembly arrangement is shown for example in U.S. Patent Publication No. US 2020/0020486 A1, "LOW PROFILE WET ELECTROLYTIC TANTA- LUM CAPACITOR," the entire contents of which is incorporated by reference as if fully set forth herein.

The anode plates 58 may be formed using sintered tantalum powder. An anode of sintered tantalum powder is sometimes referred to in the relevant art as an anode "pellet" or "slug." Such anode of sintered tantalum powder forms a porous "slug" with a large surface area. An oxide layer may form over the surface of the anode plates 58 to function as an anode of the capacitor body 10. A dielectric layer may be formed on the anode plates 58 by an anodization process, whereby anodic oxidation of the anode material may form an oxide layer over the surface, and preferably the entire surface, of the anode plates 58.

Each of the anode plates 58 may be formed having a generally rectangular shape as shown in FIGS. 11A and 11B. Each of the anode plates 58 may include a first surface (e.g., top or upper surface) arranged to face the first surface 24 of the case 12 and a second surface (e.g., bottom or lower surface) arranged to face the second surface 26 of the case 12.

Each of the anode plates 58 preferably includes an anode plate wire. Each anode plate wire may be formed of any suitable type of material, such as tantalum, niobium, and titanium, or a suitable conductive metal. Although in some aspects the anode plate wire may have a circular cross-section, alternative implementations are possible in which the anode plate wire may have another type of cross-section, such as a rectangular cross-section.

Cathode assemblies are further provided and generally designated as cathode assemblies 76. Each of the cathode assemblies 76 may include a first surface (e.g., top or upper surface) arranged to face the first surface 24 of the case 12 and a second surface (e.g., bottom or lower surface) arranged to face the second surface 26 of the case 12.

As shown in FIGS. 11A and 11B, a capacitor according to an aspect of the disclosure may include four cathode assemblies, including a first cathode assembly **76*a* arranged adjacent to the first surface of the anode plate 58*a* between the anode plate 58*a* and the first surface 24 of the case 12, a second cathode assembly 76*b* arranged between the second surface of the anode plate 58*a* and the first surface of the anode plate 58*b*, and a third cathode assembly 76*c* arranged adjacent to the second surface of the anode plate 58*b* between the anode plate 58*b* and the cover 30. Thus, a capacitor body 10** according to an aspect of the disclosure provides a multi-cathode assembly arrangement.

Each of cathode assemblies 76 preferably includes a cathode foil. The cathode foil preferably comprises tantalum. The cathode foil may be formed by stamping a tantalum foil and applying, for example, a palladium cathode layer thereto. However, alternative implementations are possible in which the cathode foil may be formed of another suitable material such as platinum, rhodium, or their oxides, sintered tantalum, electrophoretically deposited tantalum, graphite, intrinsically conducting polymer (ICP), palladium, Ruthenium (IV) oxide (RuO2), or carbon, or any other cathode material. Further, surfaces of the cathode foil and portions of the inner surface of the case 12 may form various cathode layers. The cathode foil and portions of the inner surface of the case 12 may include sintered tantalum, as described in U.S. Pat. No. 9,947,479 and U.S. Published Patent Application No. 2017/0207031 A1, the entire contents of each of which are incorporated by reference herein. The cathode foil and portions of the inner surface of the case 12 may include electrophoretically deposited tantalum, as described in U.S. Pat. No. 9,070,512, the entire contents of which is incorporated by reference herein.

Each of the cathode assemblies 76 may further include a first separator sheet and a second cathode separator sheet, with a cathode foil sandwiched between the first separator sheet and a second cathode separator sheet. The cathode separator sheets may be formed of PTFE or another non-conductive and/or insulative material permeable by electrolyte. The cathode separator sheets insulate the cathode foil from adjacent anode plates 58.

Each of the cathode assemblies 76 further includes a cathode foil extension or tab extending from and in electrical communication with the cathode foil, and extending beyond the first cathode separator sheet and a second cathode separator sheet. Each of the cathode assemblies 76 may be shaped having a generally rectangular shape, with cut-out, beveled or angled corners. These corner portions are configured to align with the corner portions of the anode plates 58. The cathode tabs are positioned along the side walls of the cathode assemblies 76, but are preferably not positioned extending from the corners or at locations where the anode plate wires extend.

It is noted that alternative implementations are possible in which each of the cathode assemblies 76 may have any selected shape, such as a rectangular shape or a circular shape. In addition, the cathode tabs may have various shapes and may extend from any selected portion of the cathode foil.

According to aspects of the disclosure, as shown for example in FIGS. 11A and 11B, a wire separator 90 is provided. The wire separator 90 is arranged so as to gather, guide, organize and/or assemble portions of the anode plate wires to provide a collective contact area providing electrical communication with the anode lead wire 48. Further, the wire separator 90 provides for shock and vibration resistance, by preventing the anode wires from moving during shock and/or vibration, or decreasing such movement.

According to an aspect of the disclosure, the wire separator 90 may comprise a plate formed from PTFE. In a preferred embodiment, the wire separator includes grooves or channels in a first surface (e.g., an "upper" or "top" surface). The channels are preferably positioned so as to extend or run from the wire separator 90 corners toward a central portion of the wire separator 90. Thus, the channels may be considered as running diagonally across the first surface of the wire separator 90. A groove may be provided in the wire separator to engage and hold a portion of an anode plate wire in alignment and/or position. Preferably, the end or terminal portions of the anode plate wires are received in the channels. The channels may thus be sized to be at least slightly larger than a diameter of a cross-section of the anode plate wires.

The wire separator 90 is further formed with an opening through the central portion of the first surface. The opening may be circular, but alternatively may be another shape such as oblong, semi-circular, rectangular, or another shape. The opening is further configured to receive a portion of the GTMS 46, as shown. Surrounding the opening is a recessed area. The recessed area forms a step or indentation having a decreased depth adjacent to the first surface of the wire separator 90 and around the perimeter of the opening. A second surface of the wire separator 90 faces the cover 30, as shown.

An adapter plate 106 formed from a conductive material is provided, preferably formed from tantalum, which may be oxidized or anodized. The adaptor plate 106 has a first surface (e.g., a top or upper surface) and a second surface (e.g., a bottom or lower surface), as shown. The recessed area of the wire separator 90 is sized and shaped so as to receive the adapter plate 106, as shown. The adapter plate 106 may clamp, snap or press into or otherwise mechanically engage the wire separator 90. Parts of the portions of each anode plate wire are positioned within the channels of the wire separator 90. The terminal ends of the anode plate wires are connected or otherwise attached to the adapter plate 106, such as by welding. In an embodiment, the terminal ends of the anode plate wires are connected or otherwise attached to the adapter plate 106 on a second surface (e.g., a bottom or lower surface) of the adapter plate 106.

It is appreciated that the adapter plate 106 may be formed in any shape and may be sized as a circular plate, rectangular plate, a square plate, a triangular plate, an oblong plate, or any selected shape, so long as the anode plate wires can be electrically connected to such a plate configuration in order to provide electrical communication between the anode plate wires and the anode lead wire 48. When provided as a circulate plate, the adapter plate 106 may be referred to as a "disk adapter" or "disk adapter plate." The recessed area in the wire separator 90 can have a shape complimentary to any shape selected for the adapter plate 106.

A spacer plate 116 is provided. The spacer plate 116 if preferably formed from PTFE. The spacer plate 116 is sized to be received within the opening in the wire separator 90, and to cover and protect the glass insert 52 of the GTMS 46 as shown. When provided in a disk shape as shown in the Figures, the spacer plate 116 may be referred to as a "spacer disk" or "spacer disk plate." However, it is appreciated that the spacer plate 116 may be formed in any shape and may be sized as a circular plate, rectangular plate, a square plate, a triangular plate, an oblong plate, or any selected shape, so long as the spacer plate 116 can provide a cover for the glass insert 52 of the GTMS 46. The opening in the wire separator 90 can have a shape complimentary to any shape selected for the spacer plate 116.

The spacer plate 116 preferably has a central opening therethrough. A portion of the anode lead wire 48 passes through the spacer plate 116. A terminal end of the anode lead wire 48 may be received in an opening in the adapter plate 106 and welded to the adapter plate 106 at this position. The adapter plate 106 thereby provides the electrical connection of the anode plates wires and the anode lead wire 48, so as to provide an external electrical connection to the anode plates 58.

A stack assembly separator may be provided and configured to be placed over and around the anode plates 58 and cathode assemblies 76 that have been arranged in a capacitor stack assembly. The stack assembly separator may be formed of PTFE or some other non-conductive material that is permeable by an electrolyte. The stack assembly separator may have a shape that is the same, similar to, or complementary to the shape of the capacitor stack assembly and/or the case 12 and fits inside the case 12. The sidewalls of the stack assembly separator may have a height allowing the sidewalls to entirely cover the sides of the capacitor stack assembly to prevent the case 12 from short-circuiting the capacitor stack assembly. The stack assembly separator preferably includes one or more slots configured to receive the cathode extensions and allow the cathode extensions to pass through the slots.

Between the anode plate 58*b* closest to the wire separator 90 and the wire separator 90, a spacer may be provided. The spacer may be formed of PTFE. The spacer may include an adhesive such as a tape on a surface of the spacer, for attachment to surfaces of adjacent components.

Between the spacer and the wire separator 90, a gasket is preferably provided. The gasket may preferably be formed from a fluoroelastomer or similar material, and may assist in providing anti-vibration, shock absorption and stability properties to the capacitor 100. The gasket may also be formed with an opening to receive a portion of the anode lead wire 48 which may be referred to as a riser wire, to provide further stability to this attachment.

Forming and/or manufacturing a capacitor body 10 according to aspects of the disclosure will not be described, with reference to the flow chart of FIG. 12, and FIGS. 5, 6, 7, 8, and 9 described above depicting various stages of the manufacturing process. It is noted that one or more steps may be combined, that certain steps may be omitted, and that the steps may be performed in any preferred order as desired.

At step 1201, a base 214 is formed. For example, step 1201 may include, at substep 1210, forming an electrical connector 248 (e.g., comprising tantalum) that includes a pass-through portion 249 and an extended portion 513. Step 1201 may further include, at substep 1211, forming a conductive tab 228 (e.g., comprising nickel) that includes a plated region 424*a* (e.g., plated with tin, tin/lead, or another solderable material), notches 515*a*, 515*b*, and an extended portion 516. Step 1201 may further include, at substep 1215, forming an electrical assembly by mounting (e.g., welding) the extended portion 513 of the electrical connector 248 to the extended portion 516 of the conductive tab 228. Step 1201 may further include, at substep 1216, forming (e.g., plastic molding) a housing 212 around the electrical assembly 500, where the housing 212 includes recessed portions 223*a* and 223*b*, recessed portion 225, opening portion 226, recessed portion 240, recessed portions 247, and pass-through portions 234, 236, and 244. Step 1201 may further include, at substep 1217, bending (e.g., in a direction toward the bottom surface of the housing 212) the end region 517 of the conductive tab 228 at the notches 515*a*, 515*b* of the conductive tab 228 into the recessed portion 225 of the housing 212 and welding the end portion 227 of the conductive tab 228 to the interior portion 519 of the conductive tab 228 through the window defined by the opening portion 225 of the housing 212.

Step 1201 may further include, at substep 1212, forming a shield 250 that includes a pass-through portion 251. Step 1201 may further include, at substep 1218, mounting (e.g., inserting) a shield 250 over the electrical connector 248 in the recessed portion 247*a* of the housing 212.

Step 1201 may further include, at substep 1213, forming first contact pads 222 (e.g., comprising nickel) and plating (e.g., plating with tin, tin/lead, or another solderable material) one or more portions thereof. Step 1201 may further include, at substep 1219, mounting (e.g., inserting) the first contact pads 222*a*, 222*b* to the recessed portions 223*a*, 223*b* of the housing 212.

Step 1201 may further include, at substep 1214, forming (e.g., die cutting) an adhesive layer 260 that includes pass-through portions 434, 436, 440, 444, and 448. Step 1201 may further include, at substep 1220, mounting (e.g., adhering) the adhesive layer 260 to the top surface of the housing 212.

At step 1202, a capacitor body 10 is formed. The capacitor body 10 may include a casing 12, a cathode lead wire 44, an anode lead wire 48, a plug 40, the extending first screw weld stud 34, and the extending second screw weld stud 36.

At step 1203, a capacitor 100 is formed by mounting the capacitor body 10 to the base 214. For example, step 1203 may include, at substep 1230, mounting (e.g., adhering) the capacitor body 10 to the adhesive layer 260 of the base 214, such that (a) the cathode lead wire 44 of the capacitor body 10 passes through the pass-through portions 244 and 444 of the base 214, (b) the anode lead wire 48 of the capacitor body 10 passes through the pass-through portions 249 and 448 of the base 214, (c) the plug 40 of the capacitor body 10 passes through the pass-through 440 of the base 214 into the recessed portion 240 of the base 214, (d) the extending first screw weld stud 34 of the capacitor body 10 passes through the pass-through portions 234 and 434 of the base 214, and (e) the extending second screw weld stud 36 of the capacitor body 10 passes through the pass-through portions 236 and 436 of the base 214.

Step 1203 may further include, at substep 1231, affixing (e.g., welding) the first contact pads 222 of the base 214 to the casing 12 of the capacitor body 10 to provide an electrical connection (e.g., for negative SMD termination) between the cathode lead wire 44 of the capacitor body 10 and the first contact pads 222 of the base 214.

Step 1203 may further include, at substep 1232, affixing (e.g., welding) the anode lead wire 48 of the capacitor body 10 to the pass-through portion 249 of the electrical connector 248 of the base 214 to provide an electrical connection (e.g., for positive SMD termination) between the anode lead wire 48 of the capacitor body 10 and the second contact pad 224 of the base 214.

Although the features and elements of the present disclosure are described in the example aspects and/or embodiments in particular combinations, each feature may be used alone without the other features and elements of the example aspects and/or embodiments or in various combinations with or without other features and elements of the present disclosure. The foregoing descriptions of specific aspects and/or embodiments of the present technology have been presented for purposes of illustration and description. They are not intended to be exhaustive or to limit the disclosure to the precise forms disclosed, and obviously many modifications and variations are possible in light of the above teaching. The aspects and/or embodiments were chosen and described in order to best explain the principles of the present technology and its practical application, to thereby enable others skilled in the art to best utilize the present technology and various aspects and/or embodiments with various modifications as are suited to the particular use contemplated. It is intended that the scope of the disclosure be defined by the claims appended hereto and their equivalents.

It will be appreciated by persons skilled in the art that the present disclosure is not limited by what has been particularly shown and described hereinabove. Rather the scope of the present disclosure includes both combinations and sub-combinations of various features described herein as well as modifications thereof which are not in the prior art.

What is claimed is:

1. A base for a capacitor, comprising an electrical assembly comprising an electrical connector and a conductive tab electrically coupled to the electrical connector, the electrical connector comprising a tantalum disk;

a housing formed around at least a portion of the electrical assembly and comprising a first recessed portion and a second recessed portion on a surface of the housing;

a first contact pad mounted to the first recessed portion of the housing, wherein the first contact pad is configured to electrically couple to a first lead wire of a capacitor body through a casing of the capacitor body, and wherein the first contact pad is configured to provide a first terminal for electrically coupling to an electrical circuit; and a second contact pad disposed in the second recessed portion of the housing and formed from an end region of the conductive tab, wherein the second contact pad is configured to electrically couple to a second lead wire of the capacitor body through the electrical connector and the conductive tab, and wherein the second contact pad is configured to provide a second terminal for electrically coupling to the electrical circuit.

2. The base of claim 1, wherein the first terminal is a negative surface mounted device (SMD) terminal, and wherein the second terminal is a positive surface mounted device (SMD) terminal.

3. The base of claim 1, wherein the electrical connector comprises a pass-through portion defining an aperture through which the second lead wire is arranged to pass through, and wherein the pass-through portion is configured to electrically couple the electrical connector to the second lead wire.

4. The base of claim 1, wherein the end region of the conductive tab comprises a plated portion of the conductive tab.

5. A base for a capacitor, comprising an electrical assembly comprising an electrical connector and a conductive tab electrically coupled to the electrical connector;

a housing formed around at least a portion of the electrical assembly and comprising a first recessed portion and a second recessed portion on a surface of the housing;

a first contact pad mounted to the first recessed portion of the housing, wherein the first contact pad is configured to electrically couple to a first lead wire of a capacitor body through a casing of the capacitor body, and wherein the first contact pad is configured to provide a first terminal for electrically coupling to an electrical circuit; and a second contact pad disposed in the second recessed portion of the housing and formed from an end region of the conductive tab, wherein the second contact pad is configured to electrically couple to a second lead wire of the capacitor body through the electrical connector and the conductive tab, and wherein the second contact pad is configured to provide a second terminal for electrically coupling to the electrical circuit;

wherein the conductive tab comprises notches, and wherein the end region of the conductive tab is bent at the notches in a direction toward the surface of the housing into the second recessed portion of the housing to form the second contact pad, and wherein a cross-section of the second contact pad comprises a C-shaped cross section.

6. The base of claim 5, wherein the housing further comprises an opening portion on the surface of the housing defining a window exposing an interior portion of the conductive tab, and wherein an end portion of the end region of the conductive tab is welded to the interior portion of the conductive tab through the window defined by the opening portion of the housing to form the second contact pad.

7. A base for a capacitor, comprising an electrical assembly comprising an electrical connector and a conductive tab electrically coupled to the electrical connector;

a housing formed around at least a portion of the electrical assembly and comprising a first recessed portion and a second recessed portion on a surface of the housing;

a first contact pad mounted to the first recessed portion of the housing, wherein the first contact pad is configured to electrically couple to a first lead wire of a capacitor body through a casing of the capacitor body, and wherein the first contact pad is configured to provide a first terminal for electrically coupling to an electrical circuit; and a second contact pad disposed in the second recessed portion of the housing and formed from an end region of the conductive tab, wherein the second contact pad is configured to electrically couple to a second lead wire of the capacitor body through the electrical connector and the conductive tab, and wherein the second contact pad is configured to provide a second terminal for electrically coupling to the electrical circuit;

wherein the housing comprises a third recessed portion on the surface of the housing, and wherein the base further comprises a shield mounted over the electrical connector in the third recessed portion of the housing.

8. A capacitor comprising:

a capacitor body comprising a casing, a first lead wire, and a second lead wire; and a base comprising:

an electrical assembly comprising an electrical connector and a conductive tab electrically coupled to the electrical connector, the electrical connector comprising a tantalum disk;

a housing formed around at least a portion of the electrical assembly and comprising a first recessed portion and a second recessed portion on a surface of the housing;

a first contact pad mounted to the first recessed portion of the housing, wherein the first contact pad is configured to electrically couple to the first lead wire of the capacitor body through the casing of the capacitor body, and wherein the first contact pad is configured to provide a first terminal for electrically coupling the capacitor to an electrical circuit; and a second contact pad disposed in the second recessed portion of the housing and formed from an end region of the conductive tab, wherein the second contact pad is configured to electrically couple to the second lead wire of the capacitor body through the electrical connector and the conductive tab, and wherein the second contact pad is configured to provide a second terminal for electrically coupling the capacitor to the electrical circuit.

9. The capacitor of claim 8, wherein the first terminal is a negative surface mounted device (SMD) terminal, and wherein the second terminal is a positive surface mounted device (SMD) terminal.

10. The capacitor of claim 8, wherein the end region of the conductive tab comprises a plated portion of the conductive tab.

11. The capacitor of claim 8, wherein the conductive tab comprises notches, and wherein the end region of the conductive tab is bent at the notches in a direction toward the surface of the housing into the second recessed portion of the housing to form the second contact pad.

12. The capacitor of claim 11, wherein the housing further comprises an opening portion on the surface of the housing defining a window exposing an interior portion of the conductive tab, and wherein an end portion of the end region of the conductive tab is welded to the interior portion of the conductive tab through the window defined by the opening portion of the housing to form the second contact pad.

13. A capacitor comprising:

a capacitor body comprising a casing, a first lead wire, and a second lead wire; and a base comprising:

an electrical assembly comprising an electrical connector and a conductive tab electrically coupled to the electrical connector;

a housing formed around at least a portion of the electrical assembly and comprising a first recessed portion and a second recessed portion on a surface of the housing;

a first contact pad mounted to the first recessed portion of the housing, wherein the first contact pad is configured to electrically couple to the first lead wire of the capacitor body through the casing of the capacitor body, and wherein the first contact pad is configured to provide a first terminal for electrically coupling the capacitor to an electrical circuit; and a second contact pad disposed in the second recessed portion of the housing and formed from an end region of the conductive tab, wherein the second contact pad is configured to electrically couple to the second lead wire of the capacitor body through the electrical connector and the conductive tab, and wherein the second contact pad is configured to provide a second terminal for electrically coupling the capacitor to the electrical circuit;

wherein the electrical connector comprises a pass-through portion defining an aperture through which the second lead wire is arranged to pass through, and wherein the pass-through portion is configured to electrically couple the electrical connector to the second lead wire, and wherein the pass-through portion of the electrical connector is welded to the second lead wire.

14. A capacitor comprising:

a capacitor body comprising a casing, a first lead wire, and a second lead wire; and a base comprising:

an electrical assembly comprising an electrical connector and a conductive tab electrically coupled to the electrical connector;

a housing formed around at least a portion of the electrical assembly and comprising a first recessed portion and a second recessed portion on a surface of the housing;

a first contact pad mounted to the first recessed portion of the housing, wherein the first contact pad is configured to electrically couple to the first lead wire of the capacitor body through the casing of the capacitor body, and wherein the first contact pad is configured to provide a first terminal for electrically coupling the capacitor to an electrical circuit; and a second contact pad disposed in the second recessed portion of the housing and formed from an end region of the conductive tab, wherein the second contact pad is configured to electrically couple to the second lead wire of the capacitor body through the electrical connector and the conductive tab, and wherein the second contact pad is configured to provide a second terminal for electrically coupling the capacitor to the electrical circuit;

wherein the first contact pad is welded to the casing of the capacitor body.

15. A method of forming a base for a capacitor, comprising:

forming an electrical assembly comprising an electrical connector and a conductive tab electrically coupled to the electrical connector;

molding a housing around at least a portion of the electrical assembly, wherein the housing comprises a first recessed portion and a second recessed portion on a surface of the housing;

forming a first contact pad configured to electrically couple to a first lead wire of a capacitor body through a casing of the capacitor body, wherein the first contact pad is configured to provide a first terminal for electrically coupling to an electrical circuit;

mounting the first contact pad to the first recessed portion of the housing; and forming, from an end region of the conductive tab and in the second recessed portion of the housing, a second contact pad configured to electrically couple to a second lead wire of the capacitor body through the electrical connector and the conductive tab, wherein the second contact pad is configured to provide a second terminal for electrically coupling to the electrical circuit;

wherein the housing comprises an opening portion on the surface of the housing defining a window exposing an interior portion of the conductive tab, wherein the conductive tab comprises notches, and wherein forming the second contact pad comprises:

bending the end region of the conductive tab at the notches in a direction toward the surface of the housing into the second recessed portion of the housing; and welding an end portion of the conductive tab to the interior portion of the conductive tab through the window defined by the opening portion of the housing.

* * * * *